US011226660B2

(12) United States Patent
Oakley

(10) Patent No.: US 11,226,660 B2
(45) Date of Patent: Jan. 18, 2022

(54) MULTIPLE MODE DISPLAY APPARATUS

(71) Applicant: Intel Corporation, Santa Clara, CA (US)

(72) Inventor: Nicholas W. Oakley, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/913,638

(22) Filed: Jun. 26, 2020

(65) Prior Publication Data

US 2020/0326758 A1 Oct. 15, 2020

Related U.S. Application Data

(63) Continuation of application No. 16/514,263, filed on Jul. 17, 2019, now Pat. No. 10,817,031, which is a (Continued)

(51) Int. Cl.
*G06F 1/16* (2006.01)
*G06F 1/3203* (2019.01)
(Continued)

(52) U.S. Cl.
CPC ........ *G06F 1/1681* (2013.01); *G02F 1/13338* (2013.01); *G06F 1/1616* (2013.01);
(Continued)

(58) Field of Classification Search
CPC .... G06F 1/1681; G06F 1/1616; G06F 1/1637; G06F 1/1643; G06F 1/1662;
(Continued)

(56) References Cited

U.S. PATENT DOCUMENTS 1,984,092 A 12/1934 Soss
2,013,915 A 9/1935 Hughes
(Continued)

FOREIGN PATENT DOCUMENTS

JP 02105194 10/1988
JP H04-352902 12/1992
(Continued)

OTHER PUBLICATIONS

State Intellectual Property Office of People's Republic of China, "Notice of Allowance," issued in connection with Chinese Patent Application No. 201580011089.4, dated Jun. 2, 2021, 6 pages (English translation included).
(Continued)

*Primary Examiner* — Kenneth B Lee, Jr.
(74) *Attorney, Agent, or Firm* — Hanley, Flight & Zimmerman, LLC

(57) ABSTRACT

A multiple mode display apparatus and methods of use. An apparatus includes a display surface with a first and a second display area. A housing pivotally attached with the display proximate a first edge of the housing is displaceable from a coplanar position with the surface of the display device to a position wherein an angle of at least 90 degrees between the surface of the display and the housing is formed along said first edge. In the first position, the first display area is visible and activated to receive user input or to display output. The second display area is covered by the housing and placed in a mode of reduced power consumption. In the second position, the second display area is visible and activated to display output.

17 Claims, 16 Drawing Sheets

Related U.S. Application Data continuation of application No. 16/167,366, filed on Oct. 22, 2018, now Pat. No. 10,656,686, which is a continuation of application No. 15/707,708, filed on Sep. 18, 2017, now abandoned, which is a continuation of application No. 14/558,590, filed on Dec. 2, 2014, now Pat. No. 9,766,665, which is a continuation of application No. 13/094,068, filed on Apr. 26, 2011, now Pat. No. 8,947,361, which is a continuation of application No. 11/588,070, filed on Oct. 24, 2006, now Pat. No. 7,932,894, which is a continuation of application No. 10/185,154, filed on Jun. 27, 2002, now Pat. No. 7,126,588.

(51) Int. Cl.
*G06F 1/3234* (2019.01)
*G02F 1/1333* (2006.01)

(52) U.S. Cl.
CPC .......... *G06F 1/1618* (2013.01); *G06F 1/1637* (2013.01); *G06F 1/1643* (2013.01); *G06F 1/1662* (2013.01); *G06F 1/1677* (2013.01); *G06F 1/3203* (2013.01); *G06F 1/3265* (2013.01); *Y02D 10/00* (2018.01); *Y02D 30/50* (2020.08)

(58) Field of Classification Search
CPC .... G06F 1/1677; G06F 1/3203; G06F 1/3265; G02F 1/13338; Y02D 10/153
See application file for complete search history.

(56) References Cited

U.S. PATENT DOCUMENTS

| | | | |
|---|---|---|---|
| 2,200,142 | A | 5/1940 | Witschi |
| 2,721,353 | A | 10/1955 | Mackintosh |
| 4,778,260 | A | 10/1988 | Okada et al. |
| 4,824,212 | A | 4/1989 | Taniguchi |
| 4,839,837 | A | 6/1989 | Chang |
| 4,858,488 | A | 8/1989 | Butts |
| 4,903,222 | A | 2/1990 | Carter et al. |
| 5,016,849 | A | 5/1991 | Wu |
| 5,049,862 | A | 9/1991 | Dao et al. |
| 5,196,993 | A | 3/1993 | Herron et al. |
| 5,278,779 | A | 1/1994 | Conway et al. |
| 5,283,862 | A | 2/1994 | Lund |
| 5,355,279 | A | 10/1994 | Lee et al. |
| 5,375,076 | A | 12/1994 | Goodrich et al. |
| 5,414,444 | A | 5/1995 | Britz |
| 5,416,730 | A | 5/1995 | Lookofsky |
| 5,483,250 | A | 1/1996 | Herrick |
| 5,534,892 | A | 7/1996 | Tagawa |
| 5,584,054 | A | 12/1996 | Tyneski et al. |
| D377,341 | S | 1/1997 | Imai et al. |
| 5,710,576 | A * | 1/1998 | Nishiyama ........... G08B 3/1058 345/169 |
| 5,715,524 | A | 2/1998 | Jambhekar et al. |
| 5,754,160 | A | 5/1998 | Shimizu et al. |
| 5,796,577 | A | 8/1998 | Ouchi et al. |
| 5,805,121 | A | 9/1998 | Burgan et al. |
| 5,825,341 | A | 10/1998 | Pawlowski |
| 5,841,431 | A | 11/1998 | Simmers |
| 5,867,140 | A | 2/1999 | Rader |
| 5,877,733 | A | 3/1999 | Uchida et al. |
| 5,881,299 | A | 3/1999 | Nomura et al. |
| 5,995,085 | A | 11/1999 | Bowen |
| 6,094,341 | A | 7/2000 | Lin |
| 6,144,358 | A | 11/2000 | Narayanaswamy et al. |
| 6,154,359 | A | 11/2000 | Kamikakai et al. |
| 6,198,624 | B1 | 3/2001 | Margaritis |
| 6,219,681 | B1 | 4/2001 | Hawkins et al. |
| 6,223,393 | B1 | 5/2001 | Knopf |
| 6,243,258 | B1 | 6/2001 | Paratore |
| 6,256,192 | B1 | 7/2001 | Shannon |
| 6,259,597 | B1 | 7/2001 | Anzai et al. |
| 6,266,241 | B1 | 7/2001 | Van Brocklin et al. |
| 6,276,026 | B1 | 8/2001 | Wille |
| 6,292,357 | B1 | 9/2001 | Zamora et al. |
| 6,295,038 | B1 | 9/2001 | Rebeske |
| D448,764 | S | 10/2001 | Marsalka et al. |
| 6,341,061 | B1 | 1/2002 | Eisbach et al. |
| 6,527,036 | B1 | 3/2003 | Welsh |
| 6,661,404 | B1 | 12/2003 | Sirola et al. |
| 6,670,950 | B1 | 12/2003 | Chin et al. |
| 6,847,519 | B2 | 1/2005 | Arbisi et al. |
| 6,865,075 | B2 | 3/2005 | Oakley |
| 7,036,025 | B2 | 4/2006 | Hunter |
| 7,069,056 | B2 | 6/2006 | Iwata et al. |
| 7,071,917 | B2 | 7/2006 | Kori |
| 7,126,588 | B2 | 10/2006 | Oakley |
| 7,466,306 | B2 | 12/2008 | Connor et al. |
| 7,633,744 | B2 | 12/2009 | Kuhn |
| 7,636,071 | B2 | 12/2009 | O'Gorman |
| D618,683 | S | 6/2010 | Wilson et al. |
| D631,043 | S | 1/2011 | Kell |
| 7,932,894 | B2 | 4/2011 | Oakley |
| D685,781 | S | 7/2013 | Adams |
| D708,612 | S | 7/2014 | Oakley |
| D708,613 | S | 7/2014 | Oakley |
| D717,795 | S | 11/2014 | Oakley |
| D718,300 | S | 11/2014 | Oakley |
| 8,947,361 | B2 | 2/2015 | Oakley |
| 9,766,665 | B2 | 9/2017 | Oakley |
| 10,817,031 | B2 | 10/2020 | Oakley |
| 2002/0024499 | A1 | 2/2002 | Karidis et al. |
| 2002/0141146 | A1 * | 10/2002 | Mustoe ................ G06F 1/1616 361/679.04 |
| 2003/0030971 | A1 | 2/2003 | Duarte |
| 2003/0132928 | A1 | 7/2003 | Kori |
| 2003/0151888 | A1 * | 8/2003 | Chien ................ G06F 1/1616 361/679.2 |
| 2004/0001049 | A1 | 1/2004 | Oakley |
| 2004/0212602 | A1 | 10/2004 | Nako et al. |
| 2007/0247432 | A1 | 10/2007 | Oakley |
| 2009/0231233 | A1 | 9/2009 | Liberatore |
| 2011/0199310 | A1 | 8/2011 | Oakley |
| 2015/0153786 | A1 | 6/2015 | Oakley |
| 2018/0129252 | A1 | 5/2018 | Oakley |
| 2019/0235582 | A1 | 8/2019 | Oakley |
| 2019/0339744 | A1 | 11/2019 | Oakley |
| 2020/0325711 | A1 | 10/2020 | Cheah et al. |
| 2020/0326758 | A1 | 10/2020 | Oakley |

FOREIGN PATENT DOCUMENTS

| | | |
|---|---|---|
| JP | 08160387 | 6/1996 |
| JP | H10228333 | 8/1998 |
| JP | H11-112846 | 4/1999 |
| JP | 2000114608 | 4/2000 |
| JP | 2000161341 | 6/2000 |
| JP | 2002229674 | 8/2002 |
| TW | 200417306 | 9/2004 |

OTHER PUBLICATIONS

Bowman, D., "Ericsson R380 Smartphone," Geek.com PDA Review, Nov. 2000, http:/www.geek.com/hwswrev/pda/ericr380/ 10 pages.

Lim, L. "Ericsson R380—The World in Your Hands." iMobile.com. au(Australia On-Line Mobile Phone Magazine), Sep. 2001, pp. 1-3; http://www.imobile.com.au/PhoneReviews/default.asp?ID=reviewssep0101.

Williams, M., "Sony Unveils new Vaio," PCWorld.com Jan. 10, 2002 pp. 1-3 (plus three pictures); http://www.pcworld.com/news/article/0,aid,78983,00.asp.

United States Patent and Trademark Office. "Non-Final Office Action," issued in connection with U.S. Appl. No. 15/707,708, dated Jun. 21, 2018, 16 pages.

United States Patent and Trademark Office, "Final Office Action," issued in connection with U.S. Appl. No. 14/558,590, dated Feb. 3, 2016, 18 pages.

(56) References Cited

OTHER PUBLICATIONS

United States Patent and Trademark Office, "Final Office Action," issued in connection with U.S. Appl. No. 14/558,590, dated Jan. 3, 2017, 17 pages.
United States Patent and Trademark Office, "Non-Final Office Action," issued in connection with U.S. Appl. No. 14/558,590, dated Jul. 22, 2015, 16 pages.
United States Patent and Trademark Office, Non-Final Office Action, issued in connection with U.S. Appl. No. 14/558,590, dated Jun. 22, 2016, 17 pages.
United States Patent and Trademark Office, "Notice of Allowance," issued in connection with U.S. Appl. No. 14/558,590, dated May 18, 2017, 11 pages.
United States Patent and Trademark Office, "Advisory Action," issued in connection with U.S. Appl. No. 13/094,068, dated Jul. 17, 2013, 3 pages.
United States Patent and Trademark Office, "Final Office Action," issued in connection with application No. 13/094,068, dated May 23, 2013, 10 pages.
United States Patent and Trademark Office, "Final Office Action," issued in connection with U.S. Appl. No. 13/094,068, dated May 23, 2014, 10 pages.
United States Patent and Trademark Office, "Non-Final Office Action," issued in connection with U.S. Appl. No. 13/094,068, dated Nov. 23, 2012, 11 pages.
United States Patent and Trademark Office, "Non-Final Office Action," issued in connection with U.S. Appl. No. 13/094,068, dated Sep. 11, 2013, 13 pages.
United States Patent and Trademark Office, "Notice of Allowance," issued in connection with U.S. Appl. No. 13/094,068, dated Sep. 16, 2014, 11 pages.
United States Patent and Trademark Office, "Notice of Allowance," issued in connection with U.S. Appl. No. 13/094,068, dated Dec. 24, 2014, 6 pages.
United States Patent and Trademark Office, "Advisory Action," issued in connection with U.S. Appl. No. 11/588,070, dated Jul. 21, 2010, 3 pages.
United States Patent and Trademark Office, "Final Office Action," issued in connection with U.S. Appl. No. 11/588,070, dated Mar. 24, 2010, 8 pages.
United States Patent and Trademark Office, "Non-Final Office Action," issued in connection with U.S. Appl. No. 11/588,070, dated Jul. 17, 2009, 6 pages.
United States Patent and Trademark Office, "Non-Final Office Action," issued in connection with U.S. Appl. No. 11/588,070, dated Aug. 5, 2010, 7 pages.
United States Patent and Trademark Office, "Notice of Allowance," issued in connection with U.S. Appl. No. 11/588,070, dated Dec. 21, 2010, 9 pages.
United States Patent and Trademark Office, "Final Office Action," issued in connection with U.S. Appl. No. 10/185,154, dated May 17, 2005, 17 pages.
United States Patent and Trademark Office, "Final Office Action," issued in connection with U.S. Appl. No. 10/185,154, dated Nov. 29, 2005, 7 pages.
United States Patent and Trademark Office, "Non-Final Office Action," issued in connection with U.S. Appl. No. 10/185,154, dated Apr. 22, 2004, 13 pages.
United States Patent and Trademark Office, "Notice of Allowance," issued in connection with U.S. Appl. No. 10/185,154, dated Jun. 14, 2006, 8 pages.
United States Patent and Trademark Office, "Correction Notice of Allowance," issued in connection with U.S. Appl. No. 10/185,154, dated Jun. 23, 2006, 6 pages.
United States Patent and Trademark Office, "Non-Final Office Action," issued in connection with U.S. Appl. No. 29/441,009, dated Oct. 23, 2013, 5 pages.
United States Patent and Trademark Office, "Notice of Allowance," issued in connection with U.S. Appl. No. 29/441,009, dated Apr. 3, 2014, 2 pages.
United States Patent and Trademark Office, "Non-Final Office Action," issued in connection with U.S. Appl. No. 29/441,010, dated Nov. 18, 2013, 6 pages.
United States Patent and Trademark Office, "Non-Final Office Action," issued in connection with U.S. Appl. No. 29/441,010, dated Mar. 18, 2014, 4 pages.
United States Patent and Trademark Office, "Notice of Allowance," issued in connection with U.S. Appl. No. 29/441,010, dated Jul. 9, 2014, 5 pages.
United States Patent and Trademark Office, "Corrected Notice of Allowance," issued in connection with U.S. Appl. No. 29/441,010, dated Sep. 4, 2014, 2 pages.
United States Patent and Trademark Office, "Corrected Notice of Allowance," issued in connection with U.S. Appl. No. 29/441,010, dated Oct. 20, 2014, 2 pages.
United States Patent and Trademark Office, "Non-Final Office Action," issued in connection with U.S. Appl. No. 29/441,011, dated Nov. 18, 2013, 6 pages.
United States Patent and Trademark Office, "Non-Final Office Action," issued in connection with U.S. Appl. No. 29/441,011, dated Mar. 17, 2014, 4 pages.
United States Patent and Trademark Office, "Notice of Allowance," issued in connection with U.S. Appl. No. 29/441,011, dated Jul. 23, 2014, 5 pages.
United States Patent and Trademark Office, "Corrected Notice of Allowance," issued in connection with U.S. Appl. No. 29/441,011, dated Aug. 26, 2014, 2 pages.
United States Patent and Trademark Office, "Corrected Notice of Allowance," issued in connection with U.S. Appl. No. 29/441,011, dated Oct. 21, 2014, 2 pages.
United States Patent and Trademark Office, "Non-Final Office Action," issued in connection with U.S. Appl. No. 29/441,012, dated Oct. 23, 2013, 5 pages.
United States Patent and Trademark Office, "Notice of Allowance," issued in connection with U.S. Appl. No. 29/441,012, dated Feb. 27, 2014, 5 pages.
United States Patent and Trademark Office, "Corrected Notice of Allowance," issued in connection with U.S. Appl. No. 29/441,012, dated Apr. 4, 2014, 2 pages.
United States Patent and Trademark Office, "Non-Final Office Action," issued in connection with U.S. Appl. No. 16/167,366, dated Sep. 27, 2019, 8 pages.
United States Patent and Trademark Office, "Notice of Allowance," issued in connection with U.S. Appl. No. 16/167,366, dated Jan. 29, 2020, 5 pages.
Chinese Patent Office, "Notice of Rejection," issued in connection with Chinese Patent Application No. 201580011089.4, dated Nov. 25, 2019, 7 pages.
European Patent Office, "Communication Pursuant to Article 94(3) EPC," issued in connection with application No. 15772483.2, dated Oct. 18, 2019, 5 pages.
European Patent Office, "Extended European Search Report," issued in connection with European Application No. 15772483.2, dated Apr. 24, 2018, 7 pages.
European Patent Office, "Invitation Pursuant to Rule 63(1) EPC" issued in connection with European Application No. 15772483.2, dated Dec. 14, 2017, 3 pages.
International Searching Authority, "International Preliminary Report on Patentability," issued in connection with International Patent Application No. PCT/US2015/018204, dated Oct. 4, 2016, 9 pages.
International Searching Authority, "International Preliminary Report on Patentability," issued in connection with International Patent Application No. PCT/US2015/018207, dated Oct. 4, 2016, 9 pages.
International Searching Authority, "International Search Report and Written Opinion," issued in connection with International Patent Application No. PCT/US2015/018204, dated Jun. 10, 2015, 14 pages.
International Searching Authority, "International Search Report and Written Opinion," issued in connection with International Patent Application No. PCT/US2015/018207, dated May 19, 2015, 12 pages.

(56) References Cited

OTHER PUBLICATIONS

Japanese Patent Office, "Decision of Refusal," issued in connection with Japanese Patent Application No. 2016-553368, dated Jul. 31, 2018, 6 pages (includes English translation).
Japanese Patent Office, "Decision to Grant," issued in connection with Japanese Patent Application No. 2016-553368, dated Jan. 8, 2019, 2 pages (includes partial English Translation).
Japanese Patent Office, "Notice of Reasons for Refusal," issued in connection with Japanese Patent Application No. 2018-225601, dated Jan. 30, 2020, 7 pages (includes English translation).
Japanese Patent Office, "Notification of Reasons for Refusal," issued in connection with Japanese Patent Application No. 2016-553368, dated Jul. 28, 2017, 5 pages (includes English translation).
Korean Intellectual Property Office, "Notice of Allowance," issued in connection with application No. 10-2016-7023500 dated May 31, 2019, 3 pages (includes English translation).
Korean Intellectual Property Office, "Notice of Preliminary Rejection," issued in connection with Korean Patent Application No. 2016-7023500, dated Dec. 18, 2017, 11 pages (includes English translation).
Korean Intellectual Property Office, "Notice of Preliminary Rejection," issued in connection with Korean Patent Application No. 2016-7023500, dated Oct. 31, 2018, 10 pages (includes English translation).
State Intellectual Property Office of the People's Republic of China, "English Translation of Notification of the First Office Action," issued in connection with Chinese Application No. 201580011089.4, dated Sep. 5, 2018, 13 pages.
State Intellectual Property Office of the People's Republic of China, "Second Office Action," issued in connection with Chinese Application No. 201580011089.4, dated May 22, 2019, 17 pages (includes English translation).
Taiwanese Patent Office, "English Translation of Examination Opinion Notification and Search Report," issued in connection with Taiwanese Patent Application No. 105103130, dated Jul. 21, 2016, 8 pages.
Taiwanese Patent Office, "English Translation of Examination Opinion Notification," issued in connection with Taiwanese Patent Application No. 104105092, dated Feb. 17, 2016, 6 pages.
Taiwanese Patent Office, "English Translation of Examination Opinion Notification," issued in connection with Taiwanese Patent Application No. 104105092, dated Sep. 6, 2016, 7 pages.
Taiwanese Patent Office, "English Translation of Examination Opinion Notification," issued in connection with Taiwanese Patent Application No. 104105619, dated Dec. 15, 2015, 6 pages.
Taiwanese Patent Office, "English Translation of Examination Opinion Notification," issued in connection with Taiwanese Patent Application No. 105103128, dated Jul. 21, 2016, 6 pages.
Taiwanese Patent Office, "English Translation of Examination Opinion Notification," issued in connection with Taiwanese Patent Application No. 106127122, dated May 11, 2018, 6 pages (includes English translation).
Taiwanese Patent Office, "Notice of Allowance," issued in connection with Taiwanese Patent Application No. 104105092, dated Jul. 10, 2017, 3 pages (includes English translation).
Taiwanese Patent Office, "Notice of Allowance," issued in connection with Taiwanese Patent Application No. 105103128, dated Dec. 3, 2018, 3 pages (includes English translation).
Taiwanese Patent Office, "Notice of Allowance," issued in connection with Taiwanese Patent Application No. 105103130, dated Dec. 3, 2018, 3 pages (includes English translation).
Taiwanese Patent Office, "Notice of Allowance," issued in connection with Taiwanese Patent Application No. 106127122, dated Mar. 7, 2019, 3 pages (includes English translation).
Taiwanese Patent Office, "Office Action," issued in connection with Taiwanese Patent Application No. 105103128, dated Apr. 12, 2017, 3 pages.
Taiwanese Patent Office, "Office Action," issued in connection with Taiwanese Patent Application No. 105103130, dated Apr. 12, 2017, 4 pages.
Taiwanese Patent Office, "Official Letter," issued in connection with Taiwanese Patent Application No. 105103128, dated Mar. 28, 2018, 11 pages (includes English translation).
Taiwanese Patent Office, "Official Letter," issued in connection with Taiwanese Patent Application No. 105103130, dated Mar. 27, 2018, 17 pages (includes English translation).
Taiwanese Patent Office, "Search Report," issued in connection with Taiwanese Patent Application No. 106127122, dated Mar. 21, 2018, 2 pages (includes English translation).
Tawainese Patent Office, "Official Letter and Search Report," issued in connection with Taiwanese Patent Application No. 107140342, dated Feb. 6, 2020, 5 pages (includes English translation of search report).
The State Intellectual Property Office of China, "First Office Action," issued in connection with application No. 201710219937.1 dated Jul. 15, 2019, 24 pages (includes English translation).
The State Intellectual Property Office of China, "First Office Action," issued in connection with application No. 201710219949.4 dated Jul. 18, 2019, 10 pages (includes English translation).
United States Patent and Trademark Office, "Corrected Notice of Allowability," issued in connection with U.S. Appl. No. 14/996,568, dated Jul. 5, 2018, 2 pages.
United States Patent and Trademark Office, "Corrected Notice of Allowability," issued in connection with U.S. Appl. No. 14/998,225, dated Jul. 5, 2018, 4 pages.
United States Patent and Trademark Office, "Final Office Action," issued in connection with U.S. Appl. No. 14/229,835, dated Apr. 13, 2016, 13 pages.
United States Patent and Trademark Office, "Final Office Action," issued in connection with U.S. Appl. No. 14/996,568, dated Sep. 11, 2017, 12 pages.
United States Patent and Trademark Office, "Notice of Allowance," issued in connection with U.S. Appl. No. 14/996,568, dated Feb. 16, 2018, 5 pages.
United States Patent and Trademark Office, "Non-final Office Action," issued in connection with U.S. Appl. No. 14/229,830, dated Sep. 30, 2015, 12 pages.
United States Patent and Trademark Office, "Non-final Office Action," issued in connection with U.S. Appl. No. 14/229,835, dated Nov. 10, 2015, 9 pages.
United States Patent and Trademark Office, "Non-final Office Action," issued in connection with U.S. Appl. No. 14/996,568, dated Apr. 20, 2017, 12 pages.
United States Patent and Trademark Office, "Non-final Office Action," issued in connection with U.S. Appl. No. 14/998,225, dated Apr. 19, 2017, 12 pages.
United States Patent and Trademark Office, "Notice of Allowance," issued in connection with U.S. Appl. No. 14/229,830, dated Feb. 9, 2016, 5 pages.
United States Patent and Trademark Office, "Notice of Allowance," issued in connection with U.S. Appl. No. 14/998,225, dated Feb. 16, 2018, 11 pages.
United States Patent and Trademark Office, "Notice of Allowance," issued in connection with U.S. Appl. No. 16/012,469, dated Dec. 13, 2019, 5 pages.
United States Patent and Trademark Office, "Final Office Action," issued in connection with U.S. Appl. No. 14/998,225, dated Sep. 11, 2017, 16 pages.
Korean Patent Office, "Notice of Preliminary Rejection," issued in connection with application No. 2019-7025025, dated May 26, 2020, 13 pages (English translation included).
Chinese Patent Office, "Second Office Action," issued in connection with application No. 201710219949,4, dated Jun. 10, 2020, 18 pages (English translation included).
Chinese Patent Office, "Second Office Action," issued in connection with application No. 201710219937.1, dated Jul. 6, 2020, 25 pages (English translation included).
Taiwanese Patent Office, "Notice of Allowance," issued in connection with application No. 107140342, dated Jun. 5, 2020, 3 pages (English translation included).
Greenburg, S., "Designing Computers as Public Artifacts," International Journal of Design Computing: Special Issue on Design

(56) References Cited

OTHER PUBLICATIONS

Computing on the Net (DCNet'99) (1999); http://citeseerx.ist.psu.edu/viewdoc/download?doi=10.1.1.217.3374&rep=rep1&type=pdf, 14 pages.

Chinese Patent Office, "Office Action," issued in connection with Chinese Patent Application No. 201710219949.4, dated Oct. 23, 2020, 19 pages (includes English translation).

European Patent Office, "Examination Report," issued in connection with European Patent Application No. 15772483.2, dated Oct. 20, 2020, 5 pages.

Chinese Patent Office, "Office Action," issued in connection with Chinese Patent Application No. 201710219949.4, dated Mar. 4, 2021, 9 pages.

Japanese Patent Office, "Decision of Dismissal of Amendment," issued in connection with Japanese Patent Application No. 2018225601, dated Aug. 4, 2020, 4 pages (includes English translation).

Japanese Patent Office, "Decision of Refusal," issued in connection with Japanese Patent Application No. 2018225601, dated Aug. 4, 2020, 6 pages (includes English translation).

Korean Intellectual Property Office, "Notice of Allowance," issued in connection with Korean Patent Application No. 10-2019-7025025, dated Dec. 11, 2020, 4 pages (includes English translation).

The State Intellectual Property Office of People's Republic of China, "Third Office Action," issued in connection with Chinese Patent Application No. 201580011089.4, dated Jun. 24, 2020, 22 pages (includes English translation).

The State Intellectual Property Office of People's Republic of China, " Notice of Granting Patent Right," issued in connection with Chinese Patent Application No. 201710219937.1, dated Jan. 8, 2021, 2 pages (includes English translation).

The State Intellectual Property Office of People's Republic of China, "Fourth Office Action," issued in connection with Chinese Patent Application No. 201580011089.4, dated Feb. 2, 2021, 9 pages (includes English translation).

Japanese Patent Office, "Reconsideration Report by Examiner," issued in connection with Japanese Patent Application No. 2018225601, dated Feb. 26, 2021, 7 pages (includes English translation).

United States Patent and Trademark Office, "Non-Final Office Action," issued in connection with U.S. Appl. No. 16/514,263, dated Apr. 24, 2020, 7 pages.

United States Patent and Trademark Office, "Notice of Allowance," issued in connection with U.S. Appl. No. 16/514,263, dated Aug. 5, 2020, 9 pages.

Japanese Patent Office, "Appeal Decision," issued in connection with Japanese Patent Application No. 2018225601, dated Aug. 31, 2021, 30 pages (includes English translation).

Chinese Patent Office, "Office Action," issued in connection with Chinese Patent Application 201710219949.4, dated Aug. 30, 2021, 6 pages.

* cited by examiner

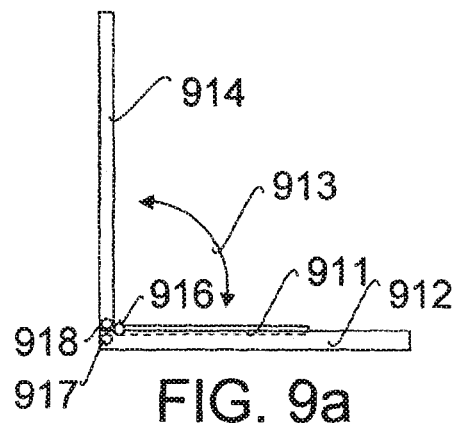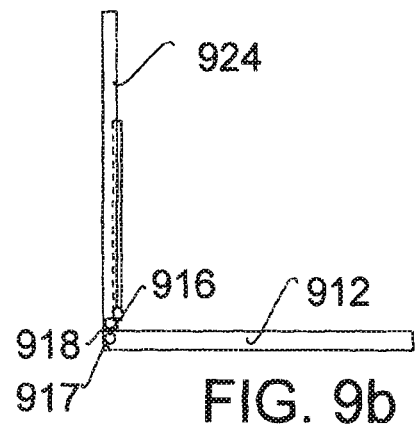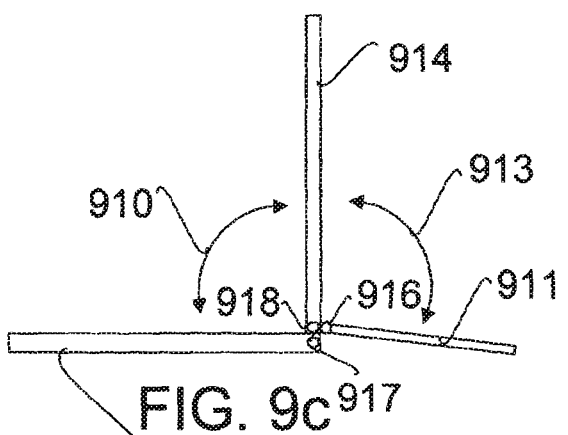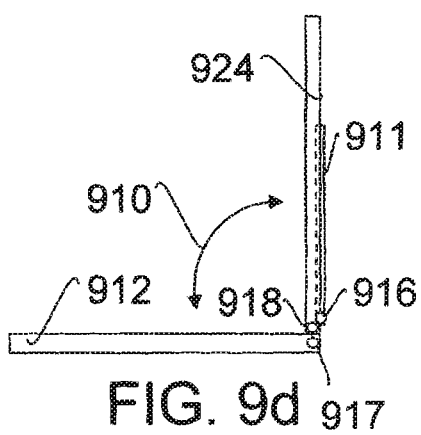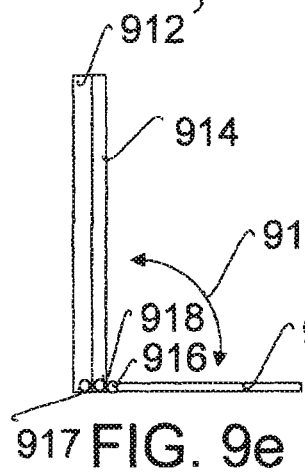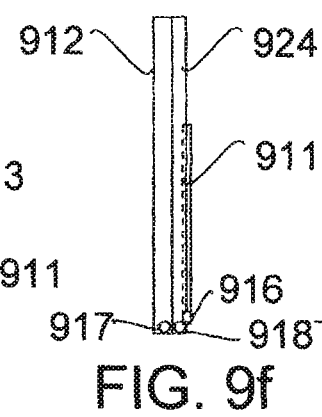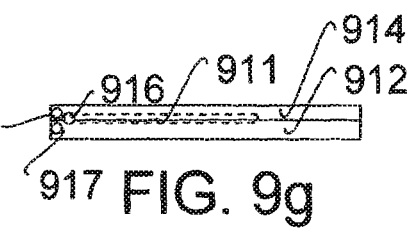

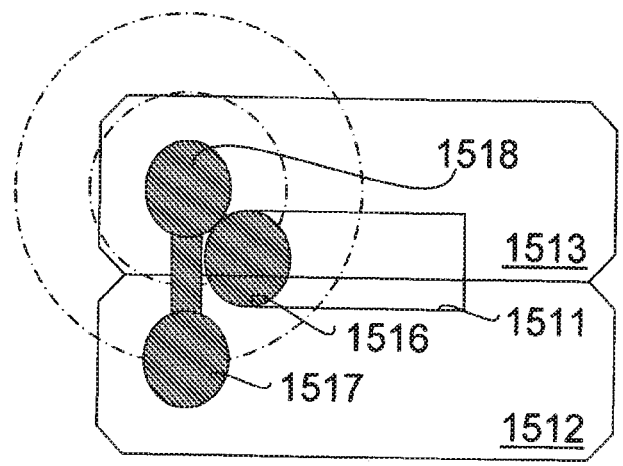
FIG. 15a
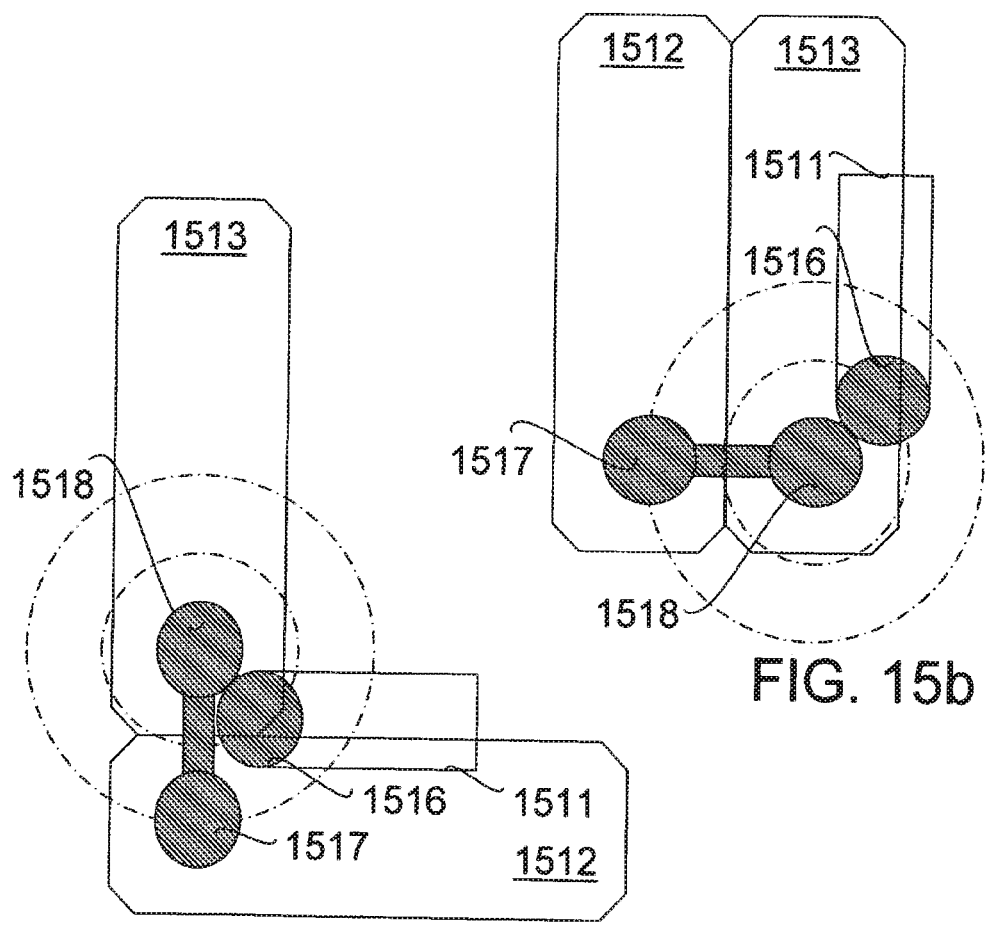
FIG. 15b
FIG. 15c

MULTIPLE MODE DISPLAY APPARATUS

CROSS-REFERENCE TO RELATED APPLICATIONS

This patent arises from a continuation of U.S. patent application Ser. No. 16/514,263, filed on Jul. 17, 2019, and entitled MULTIPLE MODE DISPLAY APPARATUS, now U.S. Pat. No. 10,817,031. U.S. patent application Ser. No. 16/514,263 arises from a continuation of U.S. patent application Ser. No. 16/167,366, filed on Oct. 22, 2018, and entitled MULTIPLE MODE DISPLAY APPARATUS, now U.S. Pat. No. 10,656,686. U.S. patent application Ser. No. 16/167,366 arises from a continuation of U.S. patent application Ser. No. 15/707,708, entitled MULTIPLE MODE DISPLAY APPARATUS, and filed on Sep. 18, 2017. U.S. patent application Ser. No. 15/707,708 arises from a continuation of U.S. patent application Ser. No. 14/558,590, filed on Dec. 2, 2014, and entitled MULTIPLE MODE DISPLAY APPARATUS, now U.S. Pat. No. 9,766,665. U.S. patent application Ser. No. 14/558,590 arises from a continuation of U.S. patent application Ser. No. 13/094,068, filed on Apr. 26, 2011, and entitled MULTIPLE MODE DISPLAY APPARATUS, now U.S. Pat. No. 8,947,361. U.S. patent application Ser. No. 13/094,068 arises from a continuation of U.S. patent application Ser. No. 11/588,070, filed on Oct. 24, 2006, and entitled MULTIPLE MODE DISPLAY APPARATUS, now U.S. Pat. No. 7,932,894. U.S. patent application Ser. No. 11/588,070 arises from a continuation of U.S. patent application Ser. No. 10/185,154, filed Jun. 27, 2002, and entitled MULTIPLE MODE DISPLAY APPARATUS, now United States U.S. Pat. No. 7,126,588. U.S. patent application Ser. No. 16/514,263, U.S. patent application Ser. No. 16/167,366, U.S. patent application Ser. No. 15/707,708, U.S. patent application Ser. No. 14/558,590, U.S. patent application Ser. No. 13/094,068, U.S. patent application Ser. No. 11/588,070, and U.S. patent application Ser. No. 10/185,154 are incorporated herein by reference in their entireties. Priority to U.S. patent application Ser. No. 16/514,263, U.S. patent application Ser. No. 16/167,366, U.S. patent application Ser. No. 15/707,708, U.S. patent application Ser. No. 14/558,590, U.S. patent application Ser. No. 13/094,068, U.S. patent application Ser. No. 11/588,070, and U.S. patent application Ser. No. 10/185,154 is hereby claimed.

BACKGROUND OF THE DISCLOSURE

Today, a personal computing and/or communicating device such as a laptop or notebook computer, for example, or a tablet or palm-held computer, has a single typical mode of use. The display of a tablet computer, for example, may be touch-sensitive for interactive user input by a stylus or pen-like device. A notebook, on the other hand, may accept interactive user input through a keyboard or a pointing device such as a mouse or a touch pad. While personal computing and/or communicating devices are rapidly changing, with new technologies for displays, pointing devices, keyboards and such, the mode of interactive user input for a particular device is typically limited to a small number of fixed functional options with some support for the addition of peripheral devices and docking configurations.

Another common characteristic of current personal computing and/or communicating devices is the importance of battery life. System manufacturers go to great lengths to conserve power and charge premiums for the latest battery technologies. Processors have design features such as automatic frequency reduction directed at limiting power consumption and display devices dim backlighting when on battery power. Systems put themselves into a standby mode after a period of no user input or when power reserves reach a critical level.

At times, it may be inconvenient for a user to have such a limited range of options. A particular user may most often need to interact with a device while holding the device in one hand, but must store or carry along one or more peripherals in order to read data from a disk or to interact with the device through a keyboard or view a full color display. If an extra battery is not readily available, the user may be forced to terminate interactive use of the device until an alternative power source is available. This situation is especially prevalent since current display devices require a significant portion of a battery's power reserves. A user carrying a notebook computer may not require a full color display or even a keyboard to read email but the device may not be so flexible as to permit easy reconfiguration.

BRIEF DESCRIPTION OF THE DRAWINGS

The present invention is illustrated by way of example and not limitation in the figures of the accompanying drawings.

FIG. 8g illustrates a closed standby or shut down configuration of the computing device of FIG. 8a.

FIG. 9a illustrates an alternative embodiment of a transformable computing device having a first user interactive configuration with a fully active display area.

FIG. 9b illustrates a second user interactive configuration of the computing device of FIG. 9a with the keyboard housing covering part of the display area to place the display device in a mode of reduced power consumption while another part of the display area remains visible and interactive.

FIG. 9c illustrates a third user interactive configuration of the computing device of FIG. 9a with a fully active display area and with the base housing pivotally displaced to support the device from behind the display.

FIG. 9d illustrates a fourth user interactive configuration of the computing device of FIG. 9a with the keyboard housing pivotally displaced to a mode of reduced power consumption while the base housing is pivotally displaced to support the device from behind the display.

FIG. 9e illustrates a fifth user interactive configuration of the computing device of FIG. 9a with a fully active display area and with the base housing pivotally displaced to a coplanar position adjacent with the back surface of the display.

FIG. 9f illustrates a sixth user interactive configuration of the computing device of FIG. 9a with the keyboard housing pivotally displaced to a mode of reduced power consumption while the base housing is pivotally displaced to a coplanar position adjacent with the back surface of the display.

FIG. 9g illustrates a closed standby or shut down configuration of the computing device of FIG. 9a.

FIG. 15a illustrates in detail another alternative embodiment of a closed, standby or shut down configuration of a transformable computing device.

FIG. 15b illustrates in detail a user interactive configuration of the transformable computing device of FIG. 15a with the keyboard housing optionally displaced to a mode of reduced power consumption while the base housing is pivotally displaced to a coplanar position adjacent with the back surface of the display.

FIG. 15c illustrates in detail another user interactive configuration of the transformable computing device of FIG. 15a with a fully active display area, the keyboard housing being supported by the base housing which is pivotally displaced to form an angle with display surface of substantially 90 degrees.

DETAILED DESCRIPTION

Figure 1:
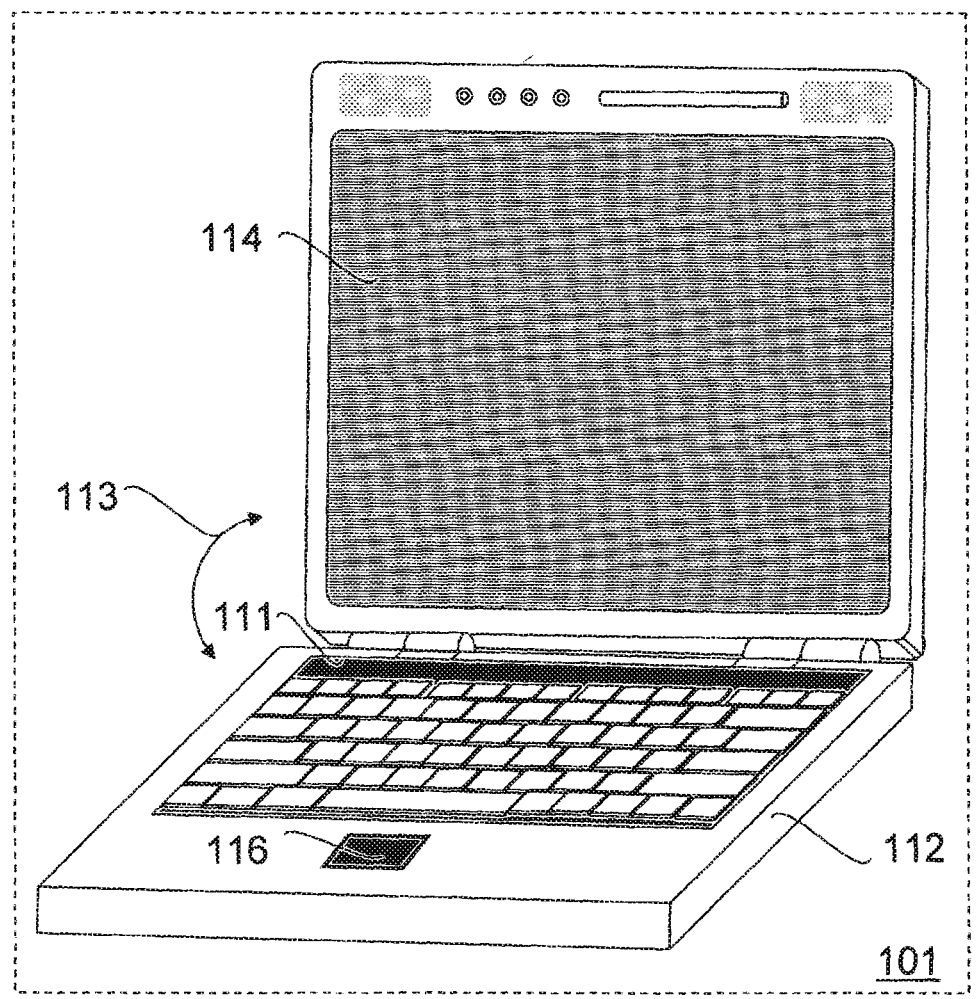
FIG. 1 illustrates one embodiment of a computing device having a first user interactive configuration with a fully active display area.

Disclosed herein is a multiple mode display apparatus and methods of use. One embodiment of an apparatus includes a display surface with a first and a second display area. A housing pivotally attached with the display proximate a first edge of the housing is displaceable from a coplanar position with the surface of the display device to a position wherein an angle of at least 90 degrees between the surface of the display and the housing is formed along said first edge. In the first position, the first display area is visible and activated to receive user input or to display output, but the second display area is covered by the housing and placed in a mode of reduced power consumption. In the second position, the second display area is visible and activated to display output.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

or the purpose of the following discussion of embodiments of the present invention, illustrative terms are used. Definitions for certain such illustrative terms follows.

A computing device or a communicating device may be understood to mean any one of a variety of devices for accessing data and/or communications. Examples include but are not limited to any combinations of one or more of the following: laptop computers, notebook computers; desktop computers, personal digital assistants, handheld computers, personal organizers; palmtop computers, pocket computers, cellular telephone/fax devices, game computers, digitizing tablet devices, electronic books, or digital audio recorder/players.

A keyboard or a key-entry device may be understood to mean any one of a variety of devices for keyed entry of data, including but not limited to a combination of one or more of the following: an alpha-numeric keyboard having symbols of any language; a telephone keypad having numeric or alpha-numeric keys and/or various redial, memory-dial, messaging or other function keys and optionally including a glide-point or other pointing device; a numeric keypad with various mathematical operation keys; a directional keypad with arrows, menus or selection keys; a gaming keypad; an entertainment or presentation key-entry device with various seek, scan, play, reverse, fast-forward, channel select, volume control, level control or other function keys; a cash register keyboard; or any custom key-entry device having mechanical, electronic, printed, projected or other type of keys for user interaction.

A display may be understood to mean any one of a variety of devices for displaying data, images, icons, etc. It may comprise a continuous or discontinuous, flat, curved or flexible display surface including but not limited to a combination of one or more of the following technologies: liquid crystal with amorphous silicon thin-film transistor, metal-insulator-metal, or polysilicon thin-film transistor active matrix displays or liquid crystal with color super-twist nematic, double-layer supertwist nematic, high performance addressing, or dual scan passive matrix displays; back lit displays; electroluminescent displays; gas plasma displays; plasma addressed liquid crystal displays; digital visual interface displays; field emission displays; cathode ray tube displays; thin cold cathode displays; organic light-emitting diode displays; light-emitting polymer displays; touch screen displays using multi-wire resistive, surface wave, touch-on-tube, or infrared touch sensing; interlaced or progressive scanned displays; heads-up displays; back-projecting displays; reflective displays; or holographic autostereoscopic displays.

It will be appreciated that the invention can may be modified in arrangement and detail by those skilled in the art without departing from the principles of the present invention within the scope of the accompanying claims and their equivalents.

Turning now to FIG. 1, one embodiment of a computing device is illustrated, the computing device having a first user interactive configuration 101 with a fully active display area 114. The computing device also includes base housing 112, keyboard housing 111, and pointing device 116. In one embodiment, base housing 112 is pivotally attached with display area 114 and comprises one or more processors, and a rechargeable battery. In one embodiment, keyboard housing 111 is electrically connected with base housing 112 by wires, and in an alternative embodiment keyboard housing 111 comprises a wireless keyboard. In the first user interactive configuration 101, keyboard housing 111 forms an angle 113 with display area 114 of substantially 90 degrees or more. For one embodiment of the first user interactive configuration 101, keyboard housing 111 and pointing device 116 are both active to receive user input.

Figure 2:
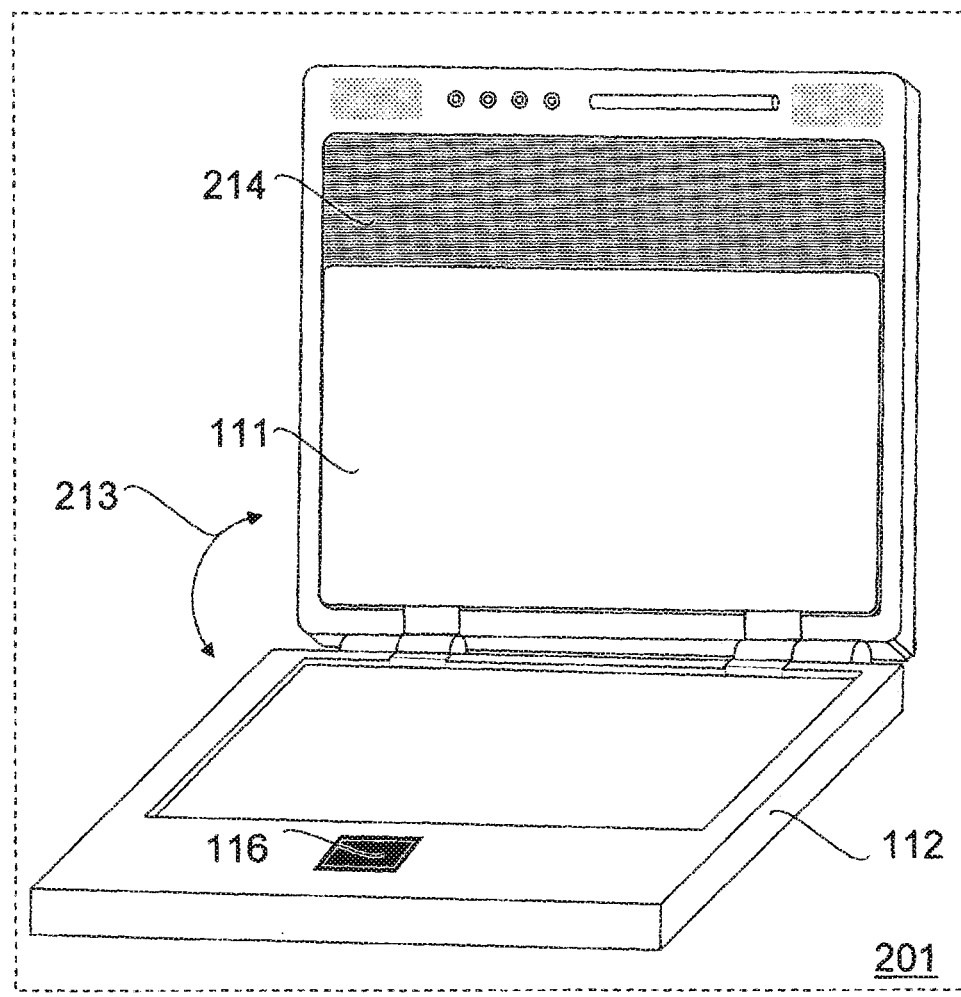
FIG. 2 illustrates a second user interactive configuration of the computing device of FIG. 1 with the keyboard housing covering part of the display area to place the display device in a mode of reduced power consumption while another part of the display area remains visible and interactive.

FIG. 2 illustrates a second user interactive configuration 201 of the computing device of FIG. 1 with the keyboard housing 111 covering a portion of the display area 114 to place the display device in a mode of reduced power consumption while another portion 214 of the display area remains visible and interactive. For one embodiment of the computing device, keyboard housing 111 is pivotally attached with display area 114, and displaced from the position of the first user interactive configuration 101 to a position substantially coplanar with display area 114 in the second user interactive configuration 201. For one alternative embodiment of the computing device, keyboard housing 111 is deactivated to transmit user input in the second user interactive configuration 201.

Figure 3:
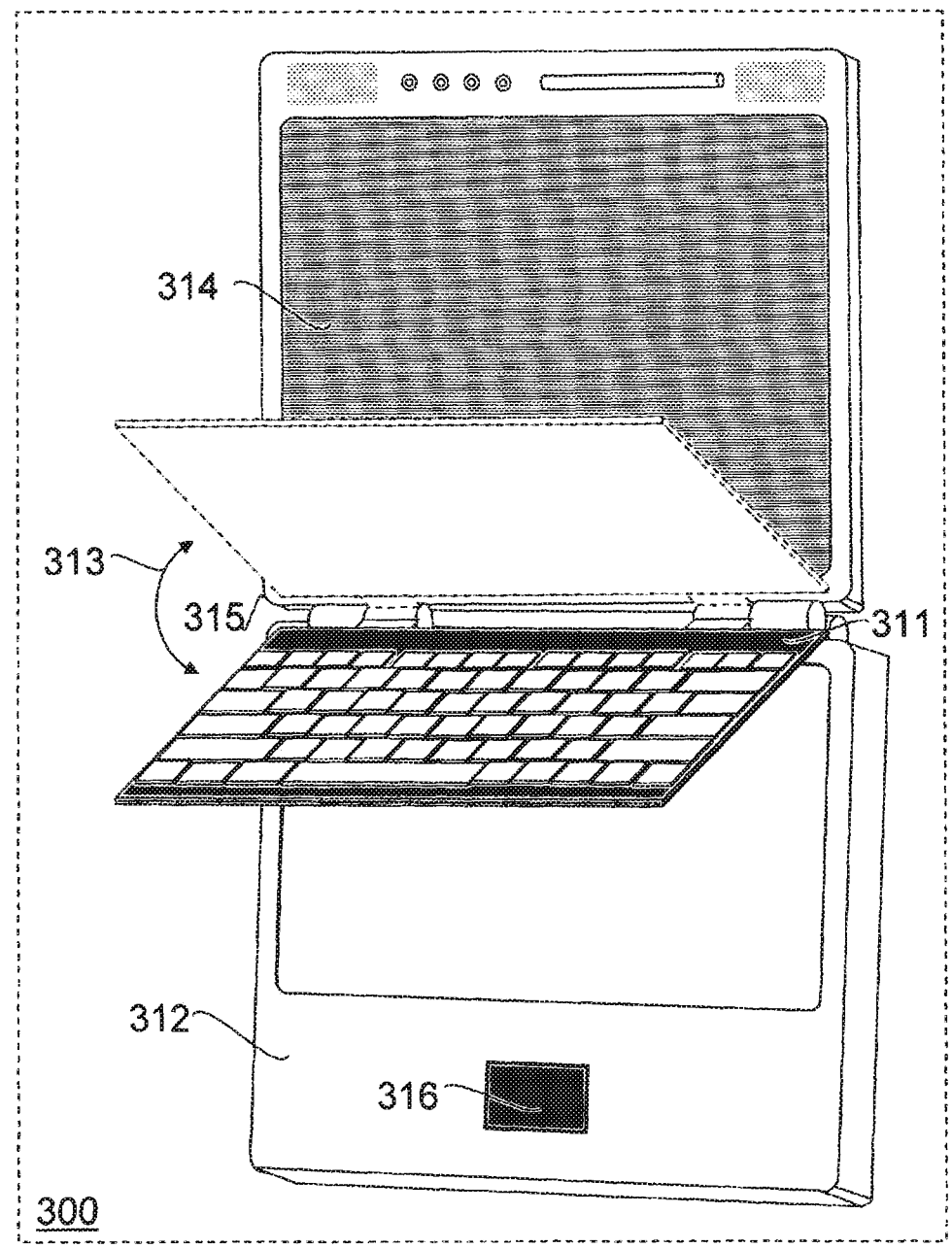
FIG. 3 illustrates one embodiment of a computing device having a pivotally attached keyboard housing.

FIG. 3 illustrates one embodiment of a computing device 300 having a display device 314 and a keyboard housing 311, which is pivotally attached with display device 314 proximate edge 315. For one embodiment of computing device 300, keyboard housing 311 is pivotally displaceable about edge 315 from a first position substantially coplanar with the surface of the display device 314 wherein a bottom portion of the display area of display device 314 is visually obscured by keyboard housing 311 and is not active to display output. Keyboard housing 311 is also displaceable to a second position with the surface of display device 314 wherein the bottom portion of the display area is visible and the entire display area of display device 314 is active to display output.

Figure 4:
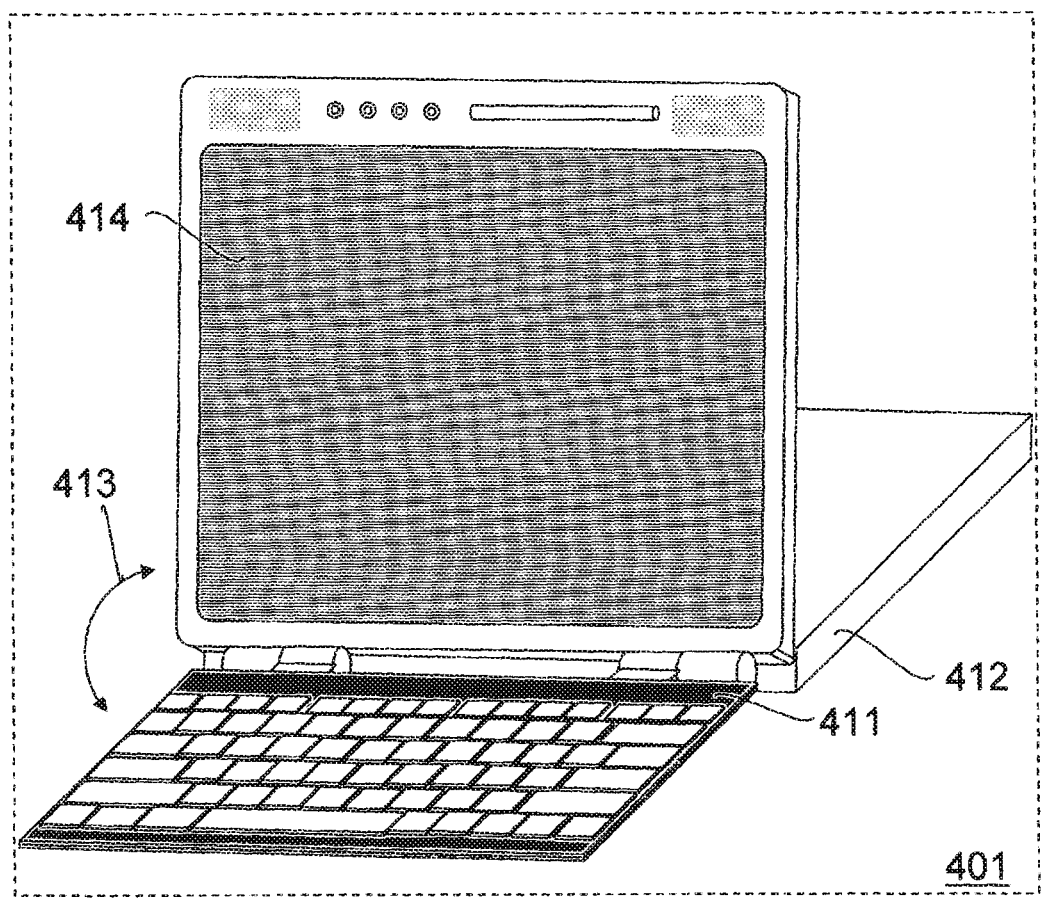
FIG. 4 illustrates an alternative embodiment of a computing device having a first user interactive configuration with a fully active display area.

FIG. 4 illustrates an alternative embodiment of a computing device having a first user interactive configuration 401 with a fully active display area 414. The computing device includes base housing 412, and keyboard housing 411. In one embodiment, base housing 412 is pivotally attached with display area 414. For one embodiment of the first user interactive configuration 401, keyboard housing 411 forms an angle 413 with display area 414 of substantially 90 degrees or more. For one embodiment of the first user interactive configuration 401, keyboard housing 411 is active to receive user input.

Figure 5:
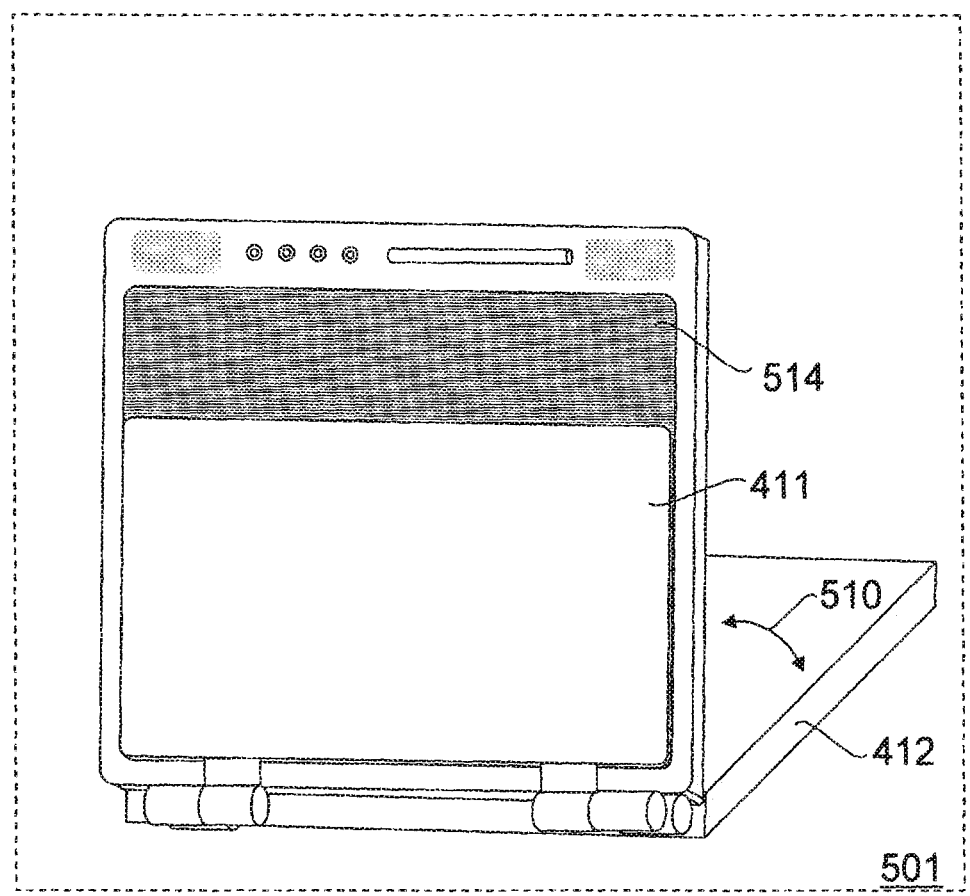
FIG. 5 illustrates a second user interactive configuration of the computing device of FIG. 4 with the keyboard housing covering part of the display area to place the display device in a mode of reduced power consumption while another part of the display area remains visible and interactive.

FIG. 5 illustrates a second user interactive configuration 501 of the computing device of FIG. 4 with the keyboard housing 411 covering a portion of the display area 414 to place the display device in a mode of reduced power consumption while another portion 514 of the display area remains visible and interactive. For one embodiment of the computing device, keyboard housing 411 is pivotally attached with display area 414, and displaced from the position of the first user interactive configuration 401 to a position substantially coplanar with display area 414 in the second user interactive configuration 501. For one alternative embodiment of the computing device, keyboard housing 411 is deactivated to transmit user input in the second user interactive configuration 401. For one alternative embodiment of the second user interactive configuration 501, base housing 412 is pivotally displaceable about an angle 513 with respect to display area 414 and keyboard housing 411.

Figure 6:
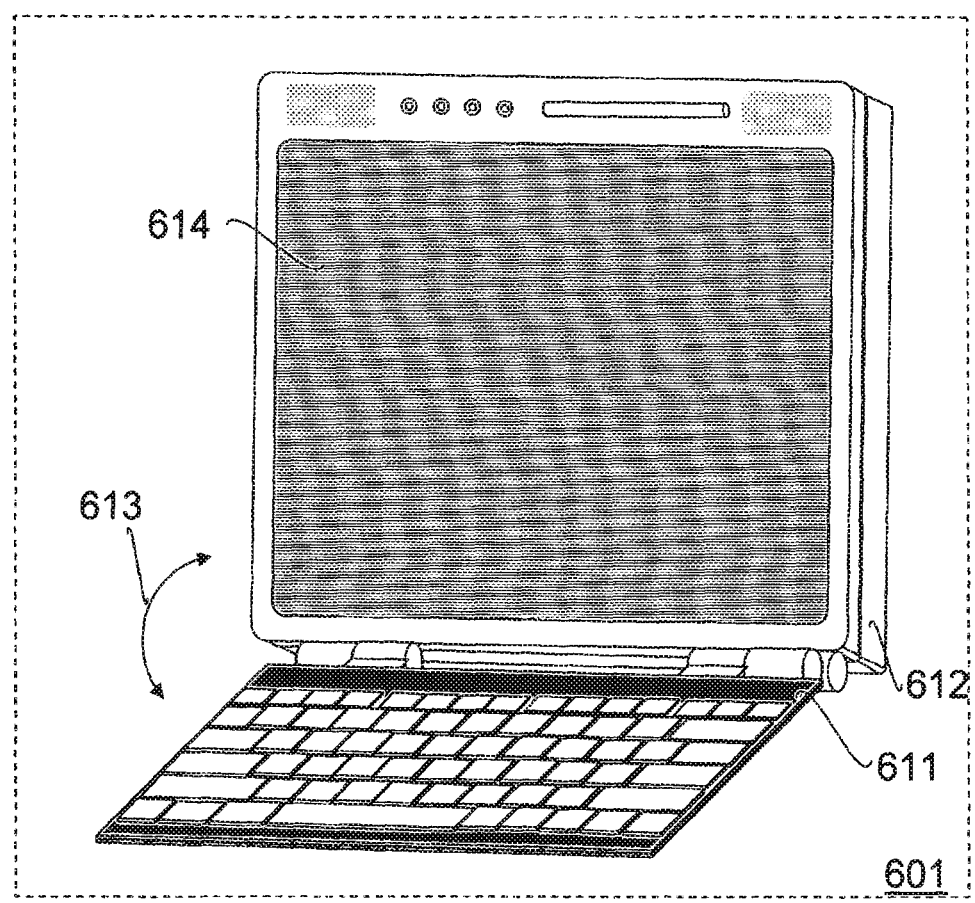
FIG. 6 illustrates another alternative embodiment of a computing device having a first user interactive configuration with a fully active display area.

FIG. 6 illustrates another alternative embodiment of a computing device having a first user interactive configuration 601 with a fully active display area 614. The computing device includes base housing 612, and keyboard housing 611. For one embodiment of the first user interactive configuration 601, keyboard housing 611 forms an angle 613 with display area 614 of substantially 90 degrees or more. For one embodiment of the first user interactive configuration 601, keyboard housing 611 is active to receive user input.

Figure 7:
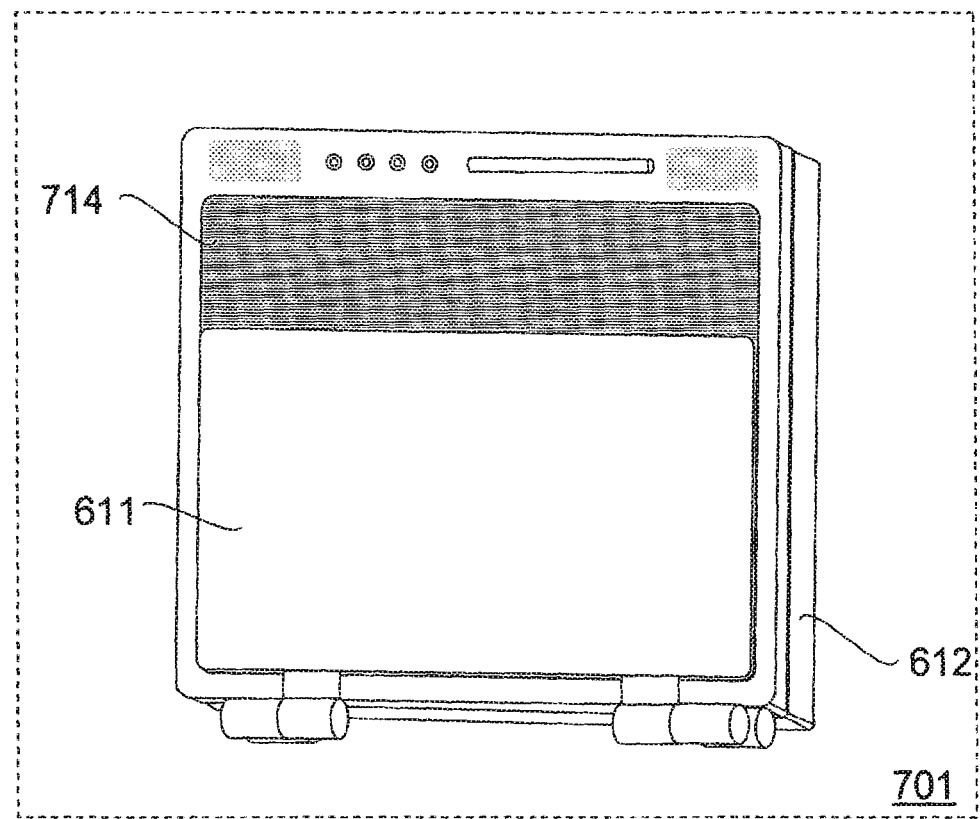
FIG. 7 illustrates a second user interactive configuration of the computing device of FIG. 6 with the keyboard housing covering part of the display area to place the display device in a mode of reduced power consumption while another part of the display area remains visible and interactive.

FIG. 7 illustrates a second user interactive configuration 701 of the computing device of FIG. 6 with the keyboard housing 611 covering a portion of the display area 614 to place the display device in a mode of reduced power consumption while another portion 714 of the display area remains visible and interactive. For one embodiment of the computing device, keyboard housing 611 is pivotally attached with display area 614, and displaced from the position of the first user interactive configuration 601 to a position substantially coplanar with display area 714 in the second user interactive configuration 701. For one alternative embodiment of the computing device, keyboard housing 611 is deactivated to transmit user input in the second user interactive configuration 701.

Figure 8A:
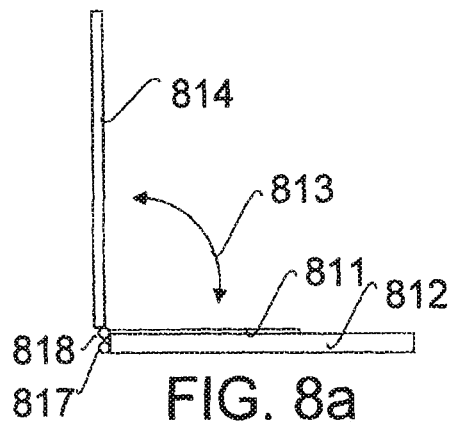
FIG. 8a illustrates one embodiment of a transformable computing device having a first user interactive configuration with a fully active display area.

FIG. 8*a* illustrates one embodiment of a transformable computing device having a first user interactive configuration with a fully active display area 814 and a keyboard housing 811 pivotally attached about pivot axis 818, keyboard housing 811 forming an angle 813 with display area 814 of substantially 90 degrees or more. For one embodiment of the transformable computing device, base housing 812 is pivotally attached about pivot axis 817 with respect to display area 814, pivot axis 818 and keyboard housing 811. For one alternative embodiment of the transformable computing device, pivot axis 817 and pivot axis 818 function as a double acting hinge. For another alternative embodiment of the transformable computing device, pivot axis 818 may be divided to permit display area 814 and keyboard housing 811 to pivot independently about pivot axis 817, functioning as a pair of double acting hinges.

Figure 8B:
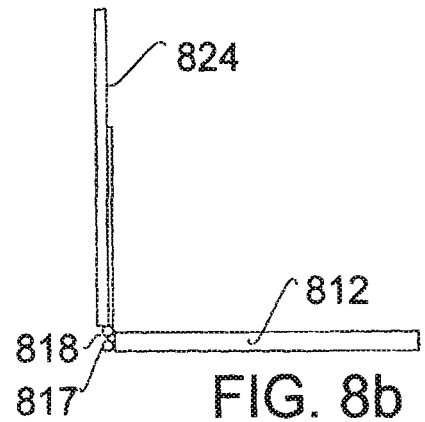
FIG. 8b illustrates a second user interactive configuration of the computing device of FIG. 8a with the keyboard housing covering part of the display area to place the display device in a mode of reduced power consumption while another part of the display area remains visible and interactive.

FIG. 8*b* illustrates a second user interactive configuration of the computing device of FIG. 8*a* with the keyboard housing 811 covering part of the display area 814 to place the display device in a mode of reduced power consumption while another part 824 of the display area remains visible and interactive. Keyboard housing 811 is displaced about pivot axis 818 from the position of the first user interactive configuration to a position substantially coplanar with display area 814 in the second user interactive configuration.

Figure 8C:
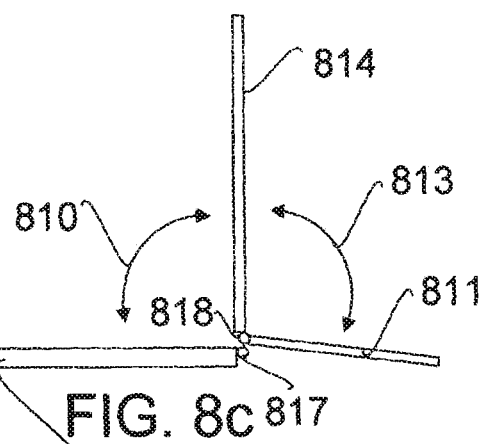
FIG. 8c illustrates a third user interactive configuration of the computing device of FIG. 8a with a fully active display area and with the base housing pivotally displaced to support the device from behind the display.

FIG. 8*c* illustrates a third user interactive configuration of the computing device of FIG. 8*a* with a fully active display area 814 and with the base housing 812 pivotally displaced about pivot axis 817, base housing 812 forming an angle 810 with a back surface opposite display area 814 of substantially 90 degrees to support the computing device from behind the display. Keyboard housing 811 forms an angle 813 about pivot axis 818 with the front surface of display area 814 of substantially 90 degrees or more.

Figure 8D:
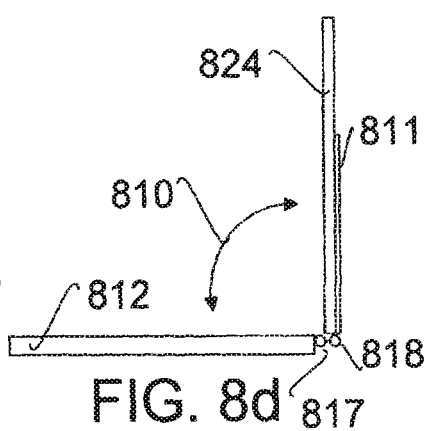
FIG. 8d illustrates a fourth user interactive configuration of the computing device of FIG. 8a with the keyboard housing pivotally displaced to a mode of reduced power consumption while the base housing is pivotally displaced to support the device from behind the display.

FIG. 8*d* illustrates a fourth user interactive configuration of the computing device of FIG. 8*a* with the keyboard housing 811 pivotally displaced about pivot axis 818 to a position substantially coplanar with display area 814 to place the display device in a mode of reduced power consumption. While keyboard housing 811 covers part of the display area 814, another part 824 of the display area remains visible and interactive. Base housing 812 is pivotally displaced about pivot axis 817, base housing 812 forming an angle 810 with the back surface opposite display area 814 of substantially 90 degrees to support the computing device from behind the display.

Figure 8E:
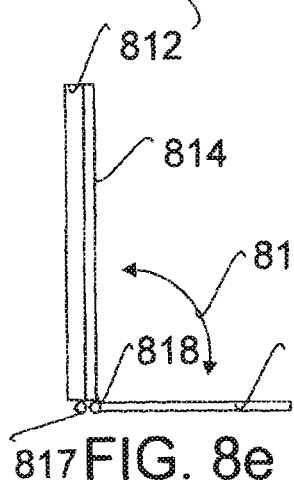
FIG. 8e illustrates a fifth user interactive configuration of the computing device of FIG. 8a with a fully active display area and with the base housing pivotally displaced to a coplanar position adjacent with the back surface of the display.

FIG. 8*e* illustrates a fifth user interactive configuration of the computing device of FIG. 8*a* with a fully active display area 814 and with the base housing 812 pivotally displaced about pivot axis 817 to a coplanar position adjacent with the back surface of the display. Keyboard housing 811 again forms an angle 813 about pivot axis 818 with the front surface of display area 814 of substantially 90 degrees or more.

Figure 8F:
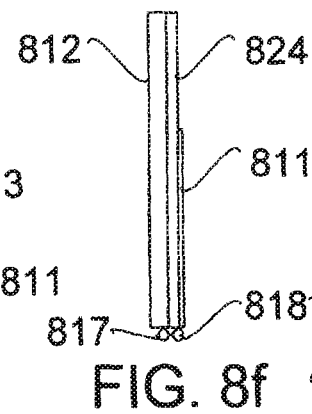
FIG. 8f illustrates a sixth user interactive configuration of the computing device of FIG. 8a with the keyboard housing pivotally displaced to a mode of reduced power consumption while the base housing is pivotally displaced to a coplanar position adjacent with the back surface of the display.

FIG. 8*f* illustrates a sixth user interactive configuration of the computing device of FIG. 8*a* with the keyboard housing 811 pivotally displaced about pivot axis 818 to a mode of reduced power consumption while the base housing 812 is pivotally displaced about pivot axis 817 to a coplanar position adjacent with the back surface of the display. While keyboard housing 811 covers part of the display area 814, another part 824 of the display area remains visible and interactive. For one embodiment of the computing device, keyboard housing 811 is deactivated to transmit user input in the coplanar position adjacent with display area 814. For an alternative embodiment of the computing device, keyboard housing 811 is activated to transmit user input in the coplanar position adjacent with display area 814 but the covered part of display area 814 is deactivated.

Figure 8G:
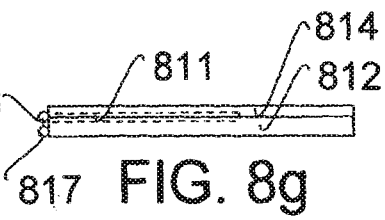

FIG. 8*g* illustrates a closed standby or shut down configuration of the computing device of FIG. 8*a*. Keyboard housing 811 is pivotally displaced about pivot axis 818 and base housing 812 is pivotally displaced about pivot axis 817 to substantially coplanar positions adjacent with display area 814. The computing device, sensing the closed position of base housing 812 with respect to display area 814 enters a second mode of reduced power consumption. For one embodiment of the computing device, keyboard housing 811 is deactivated to transmit user input and all of display area 814 is deactivated. For an alternative embodiment base housing 812 enters a standby configuration.

FIG. 9*a* illustrates an alternative embodiment of a transformable computing device having a first user interactive configuration with a fully active display area 914 pivotally attached about pivot axis 918 and a keyboard housing 911 pivotally attached about pivot axis 916, keyboard housing 911 forming an angle 913 with display area 914 of substantially 90 degrees or more. For one embodiment of the transformable computing device, base housing 912 is pivotally attached about pivot axis 917 with respect to display area 914, pivot axis 918, keyboard housing 911 and pivot axis 916. For one alternative embodiment of the transformable computing device, pivot axis 917 and pivot axis 918 function as a double acting hinge. For another alternative embodiment of the transformable computing device, pivot axis 916 and pivot axis 918 function as a second double acting hinge.

FIG. 9*b* illustrates a second user interactive configuration of the computing device of FIG. 9*a* with the keyboard housing 911 covering part of the display area 914 to place the display device in a mode of reduced power consumption while another part 924 of the display area remains visible and interactive. Keyboard housing 911 is displaced about pivot axis 916 and also about pivot axis 918 from the position of the first user interactive configuration to a position substantially coplanar with display area 914 in the second user interactive configuration.

FIG. 9c illustrates a third user interactive configuration of the computing device of FIG. 9a with a fully active display area 914 and with the base housing 912 pivotally displaced about pivot axis 917 forming an angle 910 with a back surface opposite display area 914 of substantially 90 degrees to support the computing device from behind the display. Keyboard housing 911 forms an angle 913 about pivot axis 916 and pivot axis 918 with the front surface of display area 914 of substantially 90 degrees or more.

FIG. 9d illustrates a fourth user interactive configuration of the computing device of FIG. 9a with the keyboard housing 911 pivotally displaced about pivot axis 916 and pivot axis 918 to a position substantially coplanar with display area 914 to place the display device in a mode of reduced power consumption. While keyboard housing 911 covers part of the display area 914, another part 924 of the display area remains visible and interactive. Base housing 912 is pivotally displaced about pivot axis 917 forming an angle 910 with the back surface opposite display area 914 of substantially 90 degrees to support the computing device from behind the display.

FIG. 9e illustrates a fifth user interactive configuration of the computing device of FIG. 9a with a fully active display area 914 and with the base housing 912 pivotally displaced about pivot axis 917 and pivot axis 918 to a coplanar position adjacent with the back surface of the display. Keyboard housing 911 again forms an angle 913 about pivot axis 916 and pivot axis 918 with the front surface of display area 914 of substantially 90 degrees or more.

FIG. 9f illustrates a sixth user interactive configuration of the computing device of FIG. 9a with the keyboard housing 911 pivotally displaced about pivot axis 916 and pivot axis 918 to a mode of reduced power consumption while the base housing 912 is pivotally displaced about pivot axis 917 and pivot axis 918 to a coplanar position adjacent with the back surface of the display. While keyboard housing 911 covers part of the display area 914, another part 924 of the display area remains visible and interactive. For one embodiment of the computing device, display area 914 is deactivated to transmit user input in the coplanar position adjacent with keyboard housing 911. For an alternative embodiment of the computing device, part 924 of the display area 914 is activated to transmit user input in the coplanar position adjacent with keyboard housing 911 but the covered part of display area 914 and keyboard housing 911 are deactivated.

FIG. 9g illustrates a closed standby or shut down configuration of the computing device of FIG. 9a. Keyboard housing 911 is pivotally displaced about pivot axis 916 and pivot axis 918 and base housing 912 is pivotally displaced about pivot axis 917 and pivot axis 918 to substantially coplanar positions adjacent with display area 914. The computing device, sensing the closed position of base housing 912 with respect to display area 914 enters a standby or shut down configuration.

Figure 10:
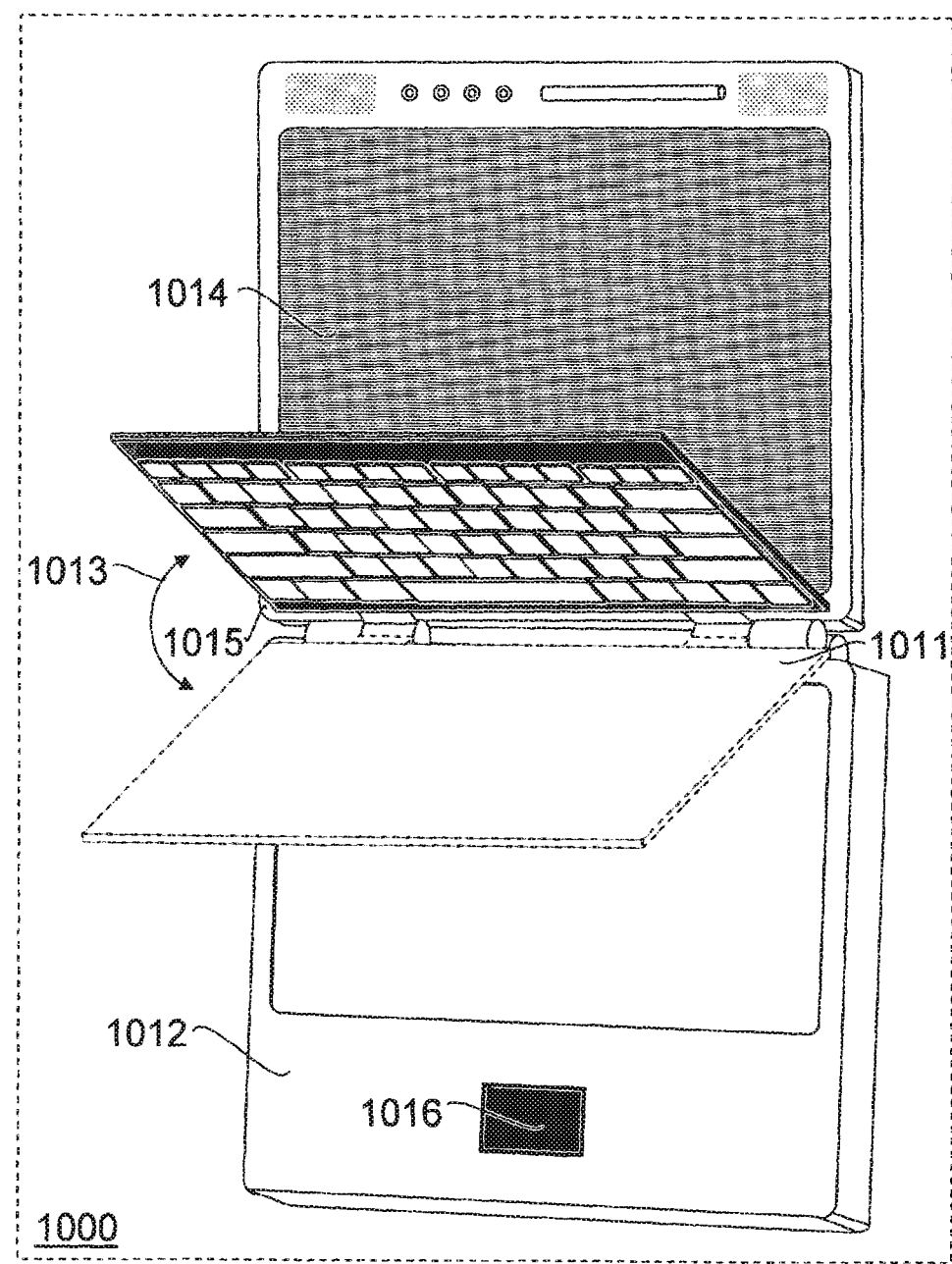
FIG. 10 illustrates an alternative embodiment of a computing device having a pivotally attached keyboard housing.

FIG. 10 illustrates an alternative embodiment of a computing device 1000 having a display device 1014 and a keyboard housing 1011, which is pivotally attached with display device 1014 proximate edge 1015. For one embodiment of computing device 1000, keyboard housing 1011 is pivotally displaceable about edge 1015 from a first position substantially coplanar with the surface of the display device 1014 wherein a portion of the display area of display device 1014 is visually obscured by keyboard housing 1011 and is not active to display output or to transmit user input. For one embodiment of computing device 1000, keyboard housing 1011 is active to transmit user input when in this first position. Keyboard housing 1011 is also displaceable to a second position with the surface of display device 1014 wherein the bottom portion of the display area is visible and the entire display area of display device 1014 is active to display output and to transmit user input (for example from a touch of a stylus, digit, light pen or other device).

Figure 11:
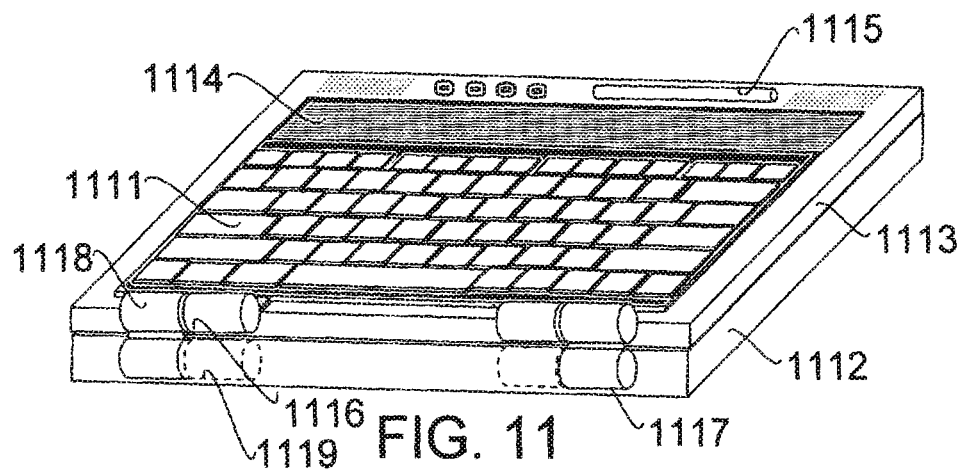
FIG. 11 illustrates one alternative embodiment of a user interactive configuration of a computing device in a mode of reduced power consumption with a keyboard housing covering part of the display area while another part of the display area remains visible and interactive, a base housing being pivotally displaced to a coplanar position adjacent with the back surface of the display.

FIG. 11 illustrates one alternative embodiment of a user interactive configuration of a computing device in a mode of reduced power consumption with a keyboard housing 1111 pivotally attached about pivot axis 1116 and covering a portion of the display area of display device 1113 while the display area 1114 remains visible and interactive, a base housing 1112 being pivotally displaced about pivot axis 1117 and pivot axis 1118 to a coplanar position adjacent with the back surface of display device 1113. For one embodiment keyboard housing 1111 is pivotally displaceable about a double acting hinge comprising pivot axis 1116 and pivot axis 1119 attached with base housing 1112. For another embodiment keyboard housing 1111 comprises a detachable and/or reversible keyboard. For one alternative embodiment display device 1113 is pivotally displaceable about a double acting hinge comprising pivot axis 1118 and pivot axis 1117 attached with base housing 1112. For another alternative embodiment keyboard housing 1111 is pivotally displaceable about pivot axis 1116 and/or pivot axis 1118 attached with display device 1113.

Figure 12:
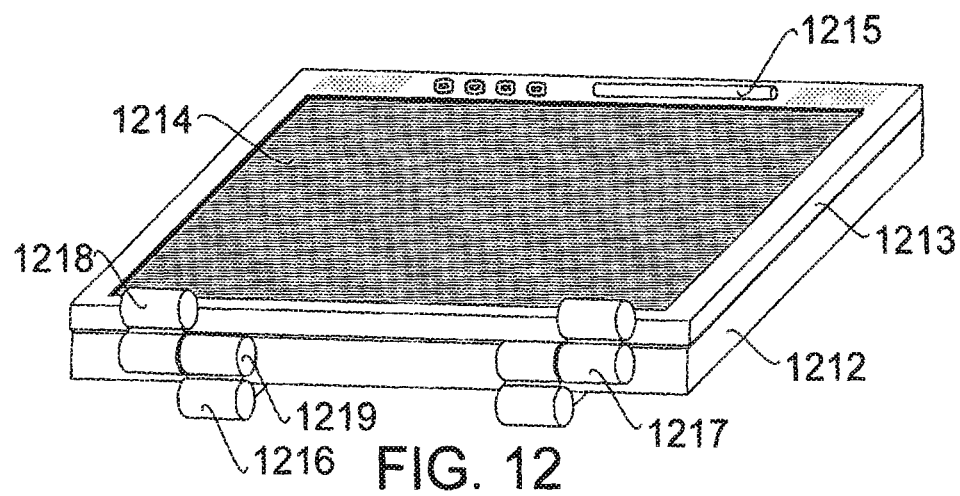
FIG. 12 illustrates another alternative embodiment of a user interactive configuration of a computing device with a fully active display area, a base housing being pivotally displaced to a coplanar position adjacent with the back surface of the display and a keyboard housing being pivotally displaced to a coplanar position adjacent with the base housing.

FIG. 12 illustrates another alternative embodiment of a user interactive configuration of a computing device with a fully active display area 1214, a base housing 1212 being pivotally displaced about pivot axis 1217 and pivot axis 1218 to a coplanar position adjacent with the back surface of the display 1213, and a keyboard housing 1211 being pivotally displaced about pivot axis 1216 and pivot axis 1219 to a coplanar position adjacent with the base housing 1212. For one embodiment of the computing device, the entire display area 1214 of display 1213 is active to display output and to transmit user input.

Figure 13:
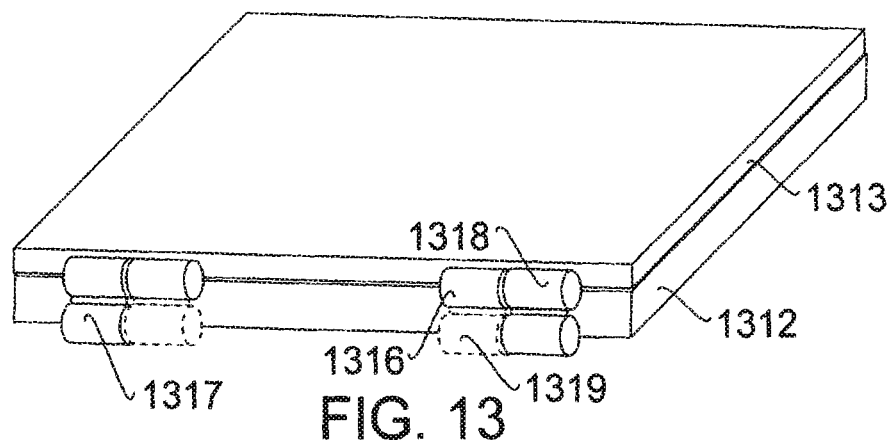
FIG. 13 illustrates a closed standby or shut down configuration of the computing device of FIG. 11 or of FIG. 12.

FIG. 13 illustrates a closed standby or shut down configuration of the computing device of FIG. 11 or of FIG. 12. A keyboard housing is pivotally displaced about pivot axis 1316 and optionally about pivot axis 1319. Base housing 1312 is pivotally displaced about pivot axis 1317 and pivot axis 1318. Both are displaced to substantially coplanar positions adjacent with display 1313. For one embodiment of the computing device, sensing the closed position of base housing 1312 with respect to display 1313, base housing 1312 enters a standby or shut down configuration.

Figure 14A:
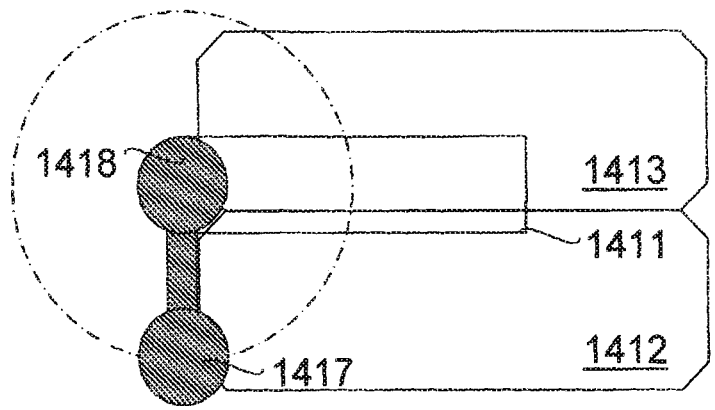
FIG. 14a illustrates in detail one alternative embodiment of a closed, standby or shut down configuration of a transformable computing device.

FIG. 14a illustrates in detail one alternative embodiment of a closed, standby or shut down configuration of a transformable computing device. Keyboard housing 1411 is pivotally displaced about pivot axis 1418 and optionally about pivot axis 1417. Base housing 1412 is pivotally displaced about pivot axis 1417 and pivot axis 1418. Both are displaced to substantially coplanar positions adjacent with display 1413. For one embodiment of the computing device, sensing the closed position, base housing 1412 enters a standby or shut down configuration.

Figure 14B:
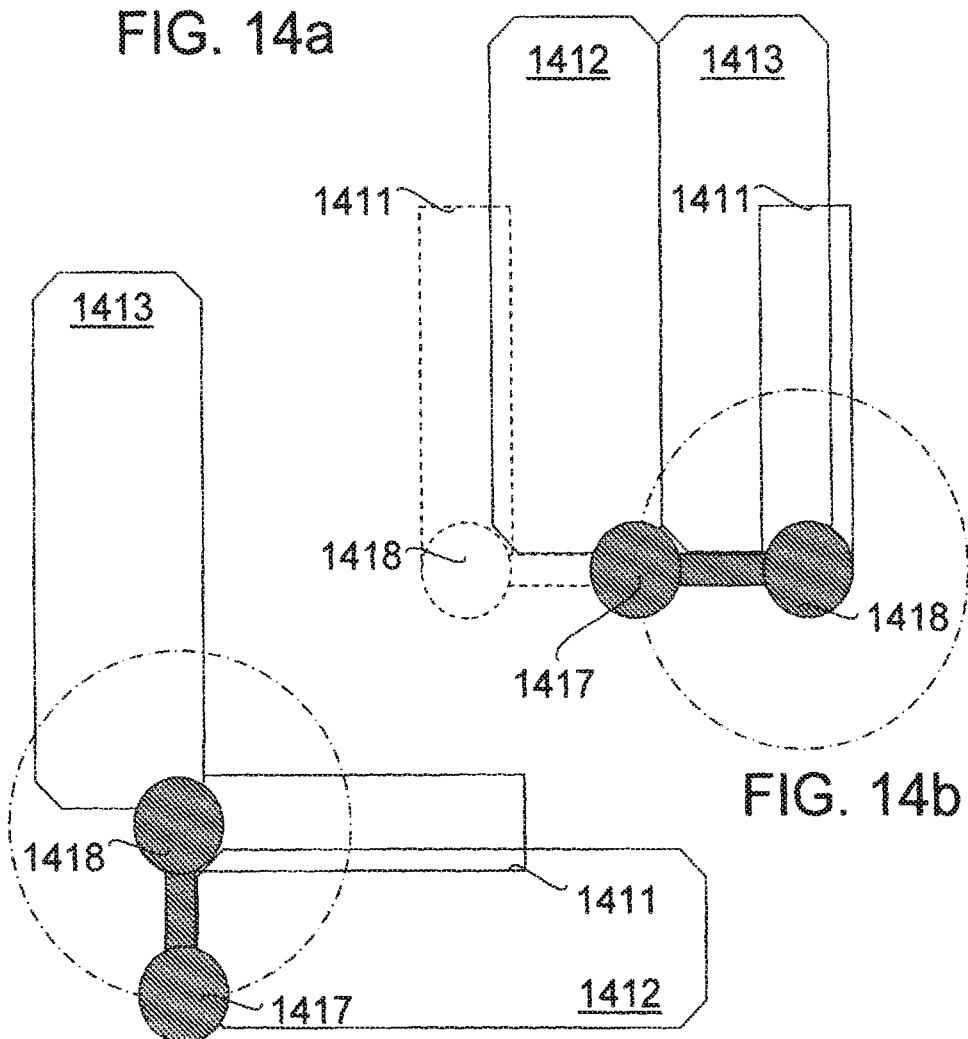
FIG. 14b illustrates in detail a user interactive configuration of the transformable computing device of FIG. 14a with the keyboard housing optionally displaced to a mode of reduced power consumption while the base housing is pivotally displaced to a coplanar position adjacent with the back surface of the display.

FIG. 14b illustrates in detail a user interactive configuration of the transformable computing device of FIG. 14a with keyboard housing 1411 optionally displaced about pivot axis 1418 and pivot axis 1417 to a mode of reduced power consumption while base housing 1412 is pivotally displaced about pivot axis 1417 and pivot axis 1418 to a coplanar position adjacent with the back surface of display 1413.

Figure 14C:
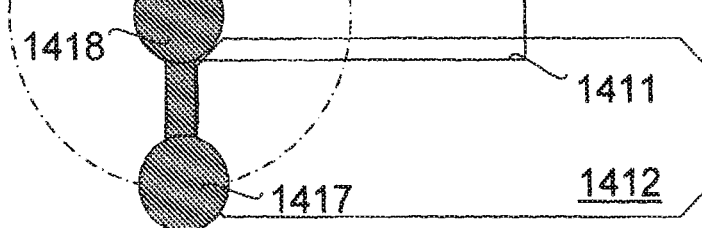
FIG. 14c illustrates in detail another user interactive configuration of the transformable computing device of FIG. 14a with a fully active display area, the keyboard housing being supported by the base housing which is pivotally displaced to form an angle with display surface of substantially 90 degrees.

FIG. 14c illustrates in detail another user interactive configuration of the transformable computing device of FIG. 14a with a fully active display 1413, keyboard housing 1411 being supported by base housing 1412 which is pivotally displaced to form an angle of substantially 90 degrees with the front surface of display 1413.

FIG. 15a illustrates in detail another alternative embodiment of a closed, standby or shut down configuration of a transformable computing device. Keyboard housing 1511 is pivotally displaced about pivot axis 1516 and pivot axis 1518. Base housing 1512 is pivotally displaced about pivot axis 1517 and pivot axis 1518. Both are displaced to substantially coplanar positions adjacent with display 1513. For one embodiment of the computing device, sensing the closed position, base housing 1512 enters a standby or shut down configuration.

FIG. 15b illustrates in detail a user interactive configuration of the transformable computing device of FIG. 15a with keyboard housing 1511 displaced about pivot axis 1516 and pivot axis 1518 to a mode of reduced power consumption while base housing 1512 is pivotally displaced about pivot axis 1517 and pivot axis 1518 to a coplanar position adjacent with the back surface of display 1513.

FIG. 15c illustrates in detail another user interactive configuration of the transformable computing device of FIG. 15a with a fully active display 1513 pivotally attached about pivot axis 1518, keyboard housing 1511 pivotally attached about pivot axis 1516 to pivot axis 1518, and being supported by base housing 1512, which is pivotally displaced about pivot axis 1517 and pivot axis 1518 to form an angle of substantially 90 degrees with the front surface of display 1513.

Figure 16A:
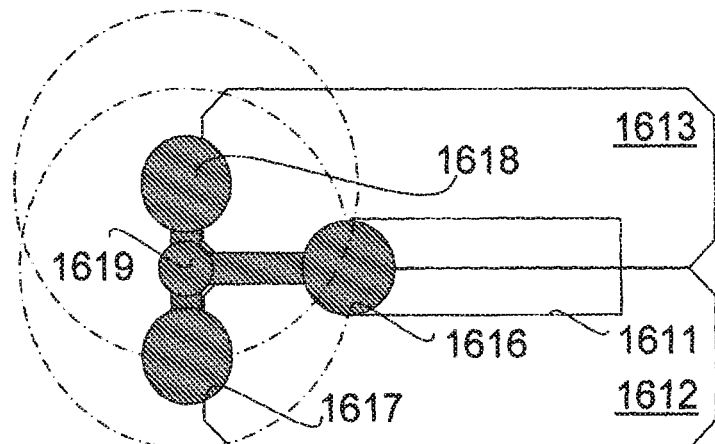
FIG. 16a illustrates in detail another alternative embodiment of a closed, standby or shut down configuration of a transformable computing device.

FIG. 16a illustrates in detail another alternative embodiment of a closed, standby or shut down configuration of a transformable computing device. Both keyboard housing 1611, pivotally displaced about pivot axis 1616 and pivot axis 1619; and base housing 1612, pivotally displaced about pivot axis 1617, are displaced to substantially coplanar positions adjacent with display 1613. Base housing 1612 enters a standby or shut down configuration.

Figure 16B:
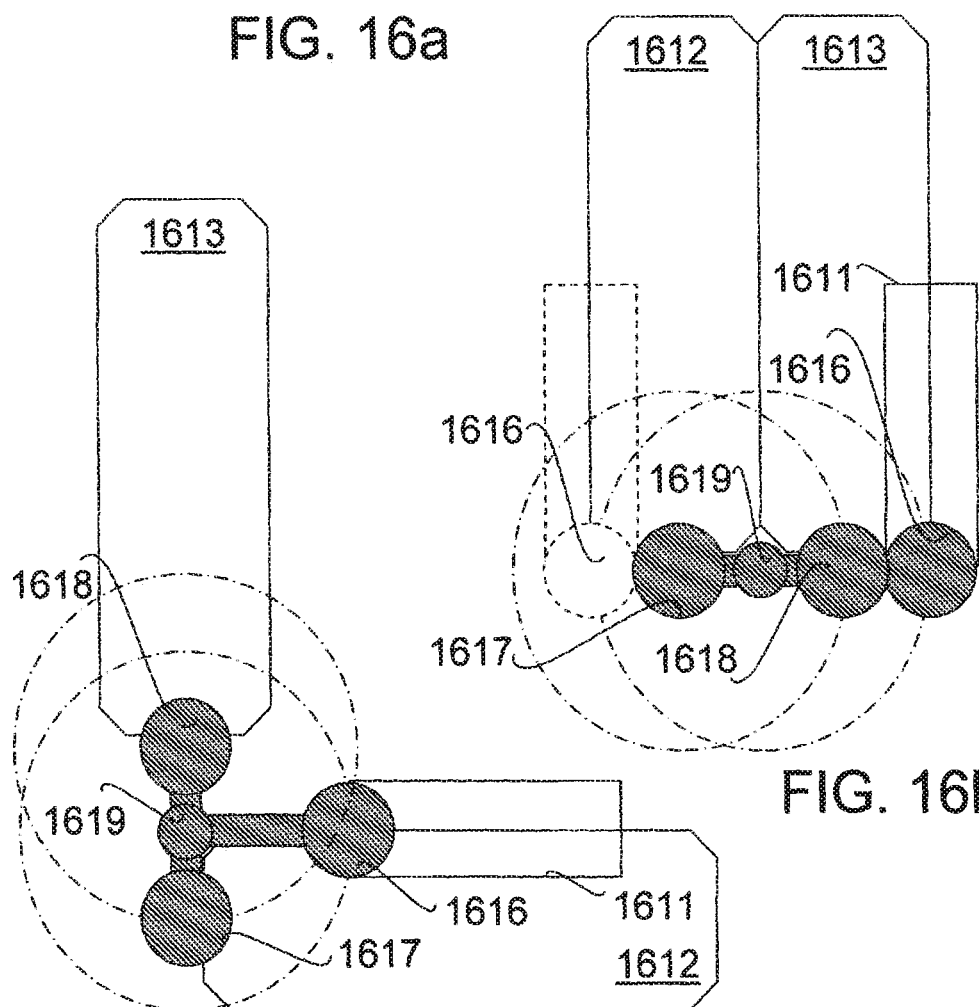
FIG. 16b illustrates in detail a user interactive configuration of the transformable computing device of FIG. 16a with the keyboard housing optionally displaced to a mode of reduced power consumption while the base housing is pivotally displaced to a coplanar position adjacent with the back surface of the display.

FIG. 16b illustrates in detail a user interactive configuration of the transformable computing device of FIG. 16a with keyboard housing 1611 optionally displaced about pivot axis 1616 and pivot axis 1619 to a mode of reduced power consumption while base housing 1612 is pivotally displaced about pivot axis 1617 and pivot axis 1618 to a coplanar position adjacent with the back surface of display 1613.

Figure 16C:
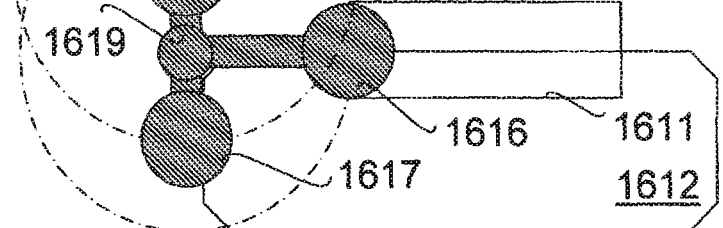
FIG. 16c illustrates in detail another user interactive configuration of the transformable computing device of FIG. 16a with a fully active display area, the keyboard housing being supported by the base housing which is pivotally displaced to form an angle with display surface of substantially 90 degrees.

FIG. 16c illustrates in detail another user interactive configuration of the transformable computing device of FIG. 16a with a fully active display 1613 pivotally attached about pivot axis 1618, keyboard housing 1611 pivotally attached about pivot axis 1616 to pivot axis 1619, and being supported by base housing 1612, which is pivotally displaced about pivot axis 1617 and pivot axis 1618 to form an angle of substantially 90 degrees with the front surface of display 1613.

Figure 17A:
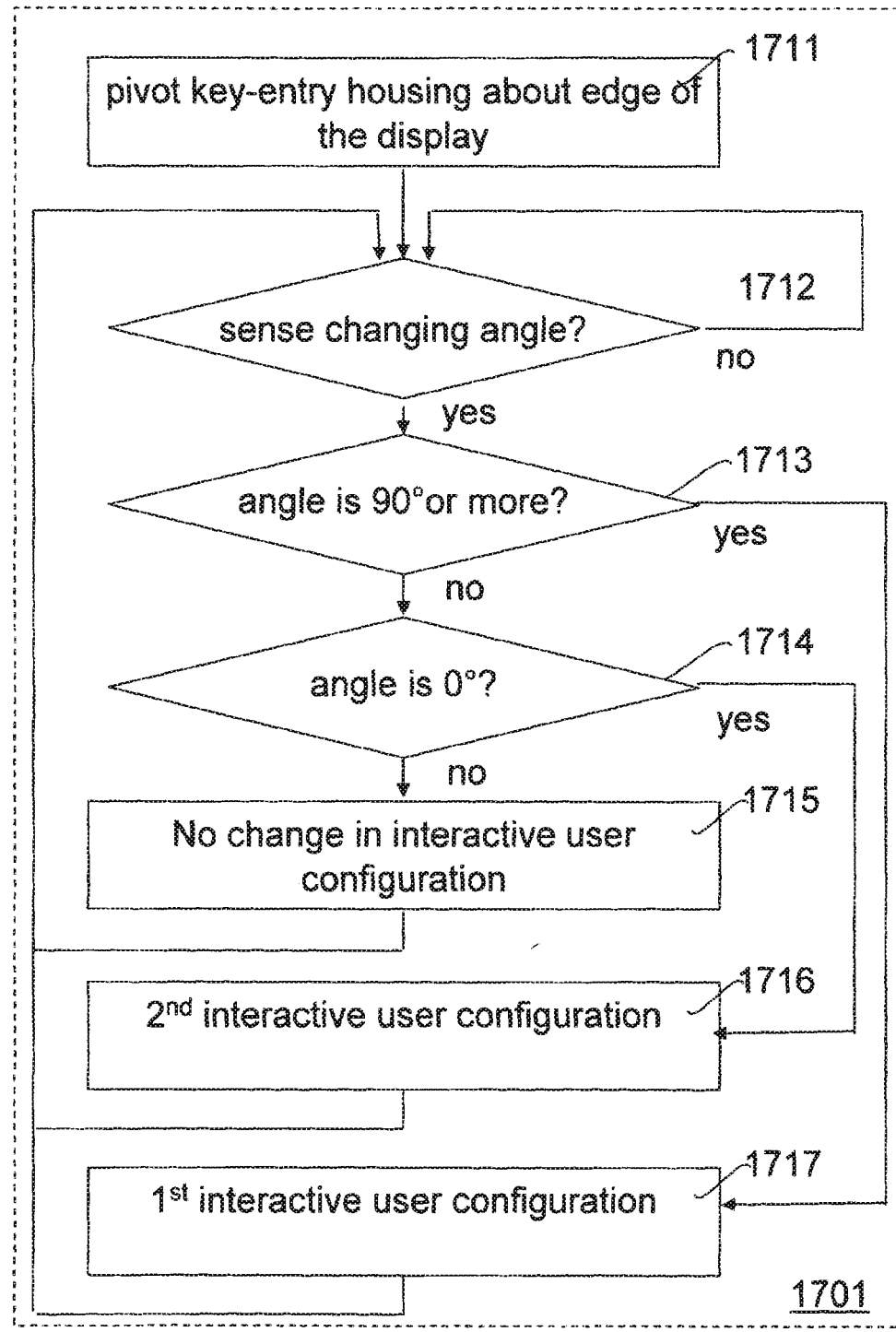
FIG. 17a illustrates a flow diagram for one embodiment of a process for configuring a plurality of user interactive modes of a transformable computing device.

FIG. 17a illustrates a flow diagram for one embodiment of a process for configuring a plurality of user interactive modes of a transformable computing device. Processing blocks that perform process 1701 and other processes herein disclosed may comprise dedicated hardware or software or firmware operation codes executable by general purpose machines or by special purpose machines or by a combination of both.

In processing block 1711 a key-entry housing is being pivoted about an edge of a display. Processing then proceeds in processing block 1712. In processing block 1712 a check is performed to see if a change in angle is sensed. If not, processing continues in processing block 1712 until a change is sensed. Otherwise, processing proceeds in processing block 1713 where the angle is checked to see if it is substantially ninety (90) degrees or more. If so, processing proceeds in processing block 1717 where the first interactive user configuration is initiated and processing then continues in processing block 1712 until another change in angle is sensed. Otherwise, processing proceeds in processing block 1714 where the angle is checked to see if it is substantially zero (0) degrees. If so, processing proceeds in processing block 1716 where the second interactive user configuration is initiated and processing then continues in processing block 1712 until another change in angle is sensed. Otherwise, processing proceeds in processing block 1715 where no change in interactive user configuration is initiated and processing returns to processing block 1712 until a new change in angle is sensed.

Figure 17B:
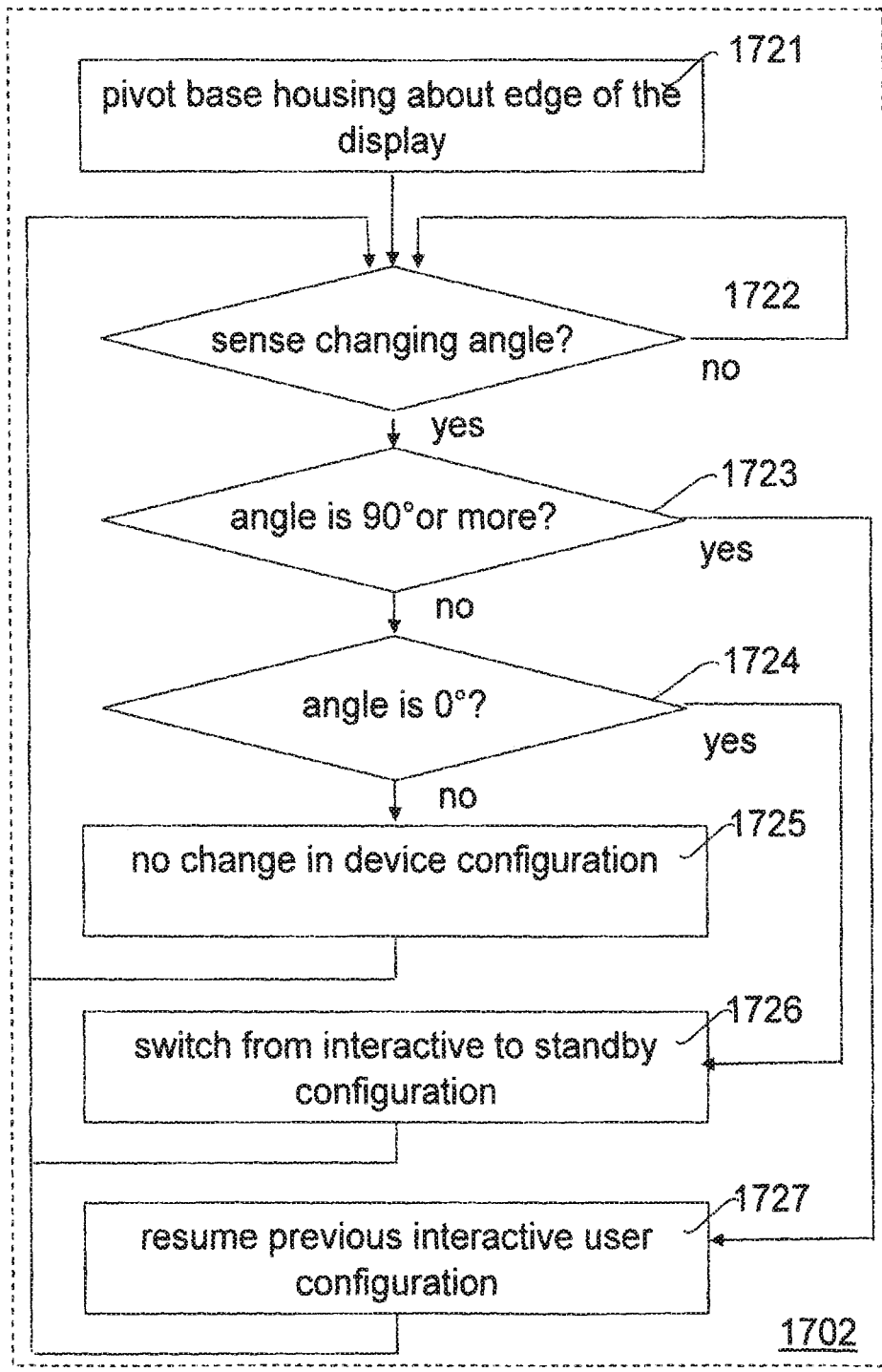
FIG. 17b illustrates a flow diagram for one embodiment of a process for optionally configuring between a plurality of user interactive modes and a standby mode of a transformable computing device.

FIG. 17b illustrates a flow diagram for one embodiment of a process 1702 for optionally configuring between a plurality of user interactive modes and a standby mode of a transformable computing device. In processing block 1721 a key-entry housing is being pivoted about an edge of a display. Processing then proceeds in processing block 1722. In processing block 1722 a check is performed to see if a change in angle is sensed. If not, processing continues in processing block 1722 until a change is sensed. Otherwise, processing proceeds in processing block 1723 where the angle is checked to see if it is substantially ninety (90) degrees or more. If so, processing proceeds in processing block 1727 where the previous interactive user configuration is resumed and processing then continues in processing block 1722 until another change in angle is sensed. Otherwise, processing proceeds in processing block 1724 where the angle is checked to see if it is substantially zero (0) degrees. If so, processing proceeds in processing block 1726 where the current interactive user configuration is switched to a standby configuration and processing then continues in processing block 1722 until another change in angle is sensed. Otherwise, processing proceeds in processing block 1725 where no change in device configuration is initiated and processing returns to processing block 1722 until a new change in angle is sensed.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents.

The invention claimed is:

1. An electronic device comprising:
   a base having a first side and a second side, the second side opposite the first side;
   a battery carried by the base;
   a keyboard including keys, the base to support the keyboard;
   a display housing having a first side and a second side, the second side opposite the first side;
   a touch screen carried by the display housing;
   a hinge to secure the base to the display housing; and
   processor circuitry to respond to selection of one of the keys of the keyboard when the electronic device is in a first configuration, wherein, in the first configuration of the electronic device, (a) an angle between the first side of the display housing and the first side of the base is less than an angle between the second side of the display housing and the second side of the base, and (b) the first side of the display housing is spaced apart from the first side of the base, and the processor circuitry to not produce a response in response to input to the keyboard in response to the electronic device being in a second configuration, wherein, in the second configuration, an angle between the second side of the display housing and the second side of the base is less than an angle between the first side of the display housing and the first side of the base.

2. The electronic device as defined in claim 1, wherein the processor circuitry is to deactivate the touch screen when the electronic device is in a third configuration, wherein in the third configuration of the electronic device, the first side of the display housing faces the first side of the base.

3. The electronic device as defined in claim 2, wherein the processor circuitry is to cause the touch screen to enter an active state in response to movement of the electronic device from the third configuration to the first configuration.

4. The electronic device as defined in claim 1, further including a track pad, the base to support the track pad.

5. The electronic device as defined in claim 4, wherein the processor circuitry is to cause the track pad to enter an active state in response to the electronic device being in the first configuration.

6. The electronic device as defined in claim 1, wherein the angle between the second side of the display housing and the second side of the base is less than 90 degrees in the second configuration.

7. The electronic device as defined in claim 1, wherein the hinge defines a first pivot axis and a second pivot axis, at least one of the display housing or the base to move about at least one of the first pivot axis or the second pivot axis.

8. The electronic device as defined in claim 7, wherein the hinge is a first hinge and further including a second hinge, the first hinge and the second hinge to define the first pivot axis.

9. The electronic device as defined in claim 1, wherein the second side of the display housing is spaced apart from the second side of the base in the second configuration.

10. A method comprising:

causing processor hardware of an electronic device to respond to selection of a key of a keyboard of the electronic device in response to the electronic device being in a first configuration, wherein, in the first configuration of the electronic device, (a) an angle between a first side of a touch screen display of the electronic device and a first side of a base of the electronic device is less than an angle between a second side of the touch screen display and a second side of the base, the first side of the touch screen display opposite the second side of the touch screen display, the first side of the base opposite the second side of the base, and (b) the first side of the touch screen display is spaced apart from the first side of the base; and causing the processor hardware to not produce a response in response to input to the keyboard in response to the electronic device being in a second configuration, wherein, in the second configuration, an angle between the second side of the touch screen display and the second side of the base is less than an angle between the first side of the touch screen display and the first side of the base.

11. The method as defined in claim 10, further including deactivating the touch screen display of the electronic device in response to the electronic device being in a third configuration, wherein, in the third configuration of the electronic device, the first side of the touch screen display faces the first side of the base.

12. The method as defined in claim 11, further including causing the touch screen display to enter an active state in response to the electronic device moving from the third configuration to the first configuration.

13. The method as defined in claim 10, further including causing a track pad of the electronic device to enter an active state in response to the electronic device being in the first configuration.

14. A computer readable medium comprising instructions that, when executed, cause processor hardware of an electronic device to at least:

respond to selection of a key of a keyboard of the electronic device in response to the electronic device being in a first configuration, wherein, in the first configuration of the electronic device, (a) an angle between a first side of a touch screen display of the electronic device and a first side of a base of the electronic device is less than an angle between a second side of the touch screen display and a second side of the base, the first side of the touch screen display opposite the second side of the touch screen display, the first side of the base opposite the second side of the base, and (b) the first side of the touch screen display is spaced apart from the first side of the base; and wherein the instructions, when executed, cause the processor hardware to not produce a response in response to input to the keyboard in response to the electronic device being in a second configuration, wherein, in the second configuration, an angle between the second side of the touch screen display and the second side of the base is less than an angle between the first side of the touch screen display and the first side of the base.

15. The computer readable medium as defined in claim 14, wherein the instructions, when executed, cause the processor hardware to deactivate the touch screen display of the electronic device in response to the electronic device being in a third configuration, wherein, in the third configuration of the electronic device, the first side of the touch screen display faces the first side of the base.

16. The computer readable medium as defined in claim 15, wherein the instructions, when executed, cause the processor hardware to cause the touch screen display to enter an active state in response to movement of the electronic device from the third configuration to the first configuration.

17. The computer readable medium as defined in claim 14, wherein the instructions, when executed, cause the processor hardware to cause a track pad of the electronic device to enter an active state in response to the electronic device being in the first configuration.

* * * * *